United States Patent
Sethi

(10) Patent No.: US 11,464,214 B1
(45) Date of Patent: Oct. 11, 2022

(54) PERIODIC AND AUTOMATED WATER CHANGE DEVICE HAVING A CONFIGURABLE WATER CHANGE SCHEDULE

(71) Applicant: Navpreet Singh Sethi, Clovis, CA (US)

(72) Inventor: Navpreet Singh Sethi, Clovis, CA (US)

(*) Notice: Subject to any disclaimer, the term of this patent is extended or adjusted under 35 U.S.C. 154(b) by 0 days.

(21) Appl. No.: 17/209,226

(22) Filed: Mar. 23, 2021

(51) Int. Cl.
*A01K 63/00* (2017.01)
*A01K 63/04* (2006.01)

(52) U.S. Cl.
CPC .......... *A01K 63/006* (2013.01); *A01K 63/047* (2013.01)

(58) Field of Classification Search
CPC ...... A01K 63/006; A01K 63/047; E04H 4/12; E04H 4/1236; E04H 4/1245
USPC .......... 417/20, 23, 36, 38, 43, 44.2; 119/264
See application file for complete search history.

(56) References Cited

U.S. PATENT DOCUMENTS

| | | | | | |
|---|---|---|---|---|---|
| 2,924,959 | A * | 2/1960 | Israel, Jr. | .............. | D06F 39/085 415/61 |
| 6,444,120 | B1 * | 9/2002 | Morgan | ................. | A01K 63/04 119/259 |
| 7,195,461 | B2 * | 3/2007 | Allington | ............... | G01N 13/00 417/44.2 |
| 7,849,877 | B2 * | 12/2010 | Tan | ....................... | F16K 11/076 251/285 |
| 8,747,075 | B1 * | 6/2014 | Gandini | ............... | A01K 63/065 417/32 |
| 8,920,131 | B2 * | 12/2014 | Aspen | ................. | F04D 15/0005 417/43 |
| 9,593,860 | B1 * | 3/2017 | Robinson | ............. | F24F 11/0008 |
| 2004/0045613 | A1 * | 3/2004 | Hinojosa, Jr. | .......... | A61H 33/60 137/625.47 |
| 2011/0062091 | A1 * | 3/2011 | Peters | ..................... | B01D 29/27 210/808 |
| 2012/0227172 | A1 * | 9/2012 | Hadd | ........................ | E03D 1/36 4/415 |
| 2018/0007873 | A1 * | 1/2018 | Pino | ...................... | A01K 63/003 |
| 2018/0192621 | A1 * | 7/2018 | Valatka | ................ | A01K 63/045 |
| 2021/0101816 | A1 * | 4/2021 | Frausing | ................ | B01D 29/33 |

FOREIGN PATENT DOCUMENTS

WO    WO-2018053644 A1 *  3/2018  ............... H02B 1/04

* cited by examiner

*Primary Examiner* — Tien Q Dinh
*Assistant Examiner* — Katelyn T Truong
(74) *Attorney, Agent, or Firm* — Adibi IP Group, PC; Amir V. Adibi; Andrew C. Palmer

(57) ABSTRACT

A water change system comprises a water change device that performs automated water changes. The water change device automatically drains an amount of water needing replacement from a reservoir and replenishes the reservoir with a predetermined amount of clean water. The water change device comprises a reservoir port, an output port, an input port, a controller, and an enclosure. In a draining mode, water is pumped from the reservoir, through the reservoir port and into a drain or output tank via the output port. In the reservoir filling mode, clean water from an input tank or water source is pumped into the input port of the water change device and to the reservoir via the reservoir port. The water change device automatically performs water changes in accordance with a water change schedule or in response to user input. The water change device is configurable via a touch display or remotely.

22 Claims, 28 Drawing Sheets

WATER CHANGE DEVICE PERFORMING WATER CHANGES
FOR MULTIPLE RESERVOIRS

WATER CHANGE DEVICE WITH MULTIPLE PUMPS
PERFORMING WATER CHANGES

PERIODIC AND AUTOMATED WATER CHANGE DEVICE HAVING A CONFIGURABLE WATER CHANGE SCHEDULE

TECHNICAL FIELD

The present invention relates generally to aquarium maintenance, and more specifically, to aquarium water change equipment.

BACKGROUND INFORMATION

Fish are popular household pets and are often admired for their visual appeal. Aquariums provide a water reservoir such as a tank or pond. Fish food in the form of pellets or flakes is deposited into the reservoir at periodic time intervals depending on fish type. After digestion, fish excrete waste into the water within the reservoir. The waste slowly contaminates the water in the reservoir. To ensure fish survival, water in the reservoir is partially replaced with processed and filtered water. This replacement process is referred to as a water change. During a water change, an amount of water is removed from the reservoir and drained. Next, freshly processed and filtered water is added back into the reservoir. Periodic water changes ensure that fish remain healthy and are not harmed by contaminated water.

SUMMARY

A water change system comprises a water change device that performs periodic and automated water changes. The water change device automatically drains a predetermined amount of water needing replacement from a reservoir and replenishes the reservoir with a predetermined amount of clean water. The water change device automatically performs water changes in accordance with a water change schedule that is configured by a user through an input panel on the water change device or remotely via a remote control, a web-based application, a mobile application, or a virtual assistant. Alternatively, the water change device is initiated in response to user input provided via the input panel or remotely via the remote control, web-based application, mobile application, or virtual assistant.

The water change device comprises a reservoir port, an output port, an input port, a controller, and an enclosure. The water change device is operable in a draining mode or in a filling mode. In the draining mode, water is pumped from the reservoir, through the reservoir port and into a drain or output tank via the output port. In the filling mode, clean water from an input tank or water source is pumped into the input port of the water change device and is supplied to the reservoir via the reservoir port.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings. The term "water" is used throughout the present disclosure and is understood to mean a liquid (e.g. solution, suspension, or precipitation).

Figure 1:
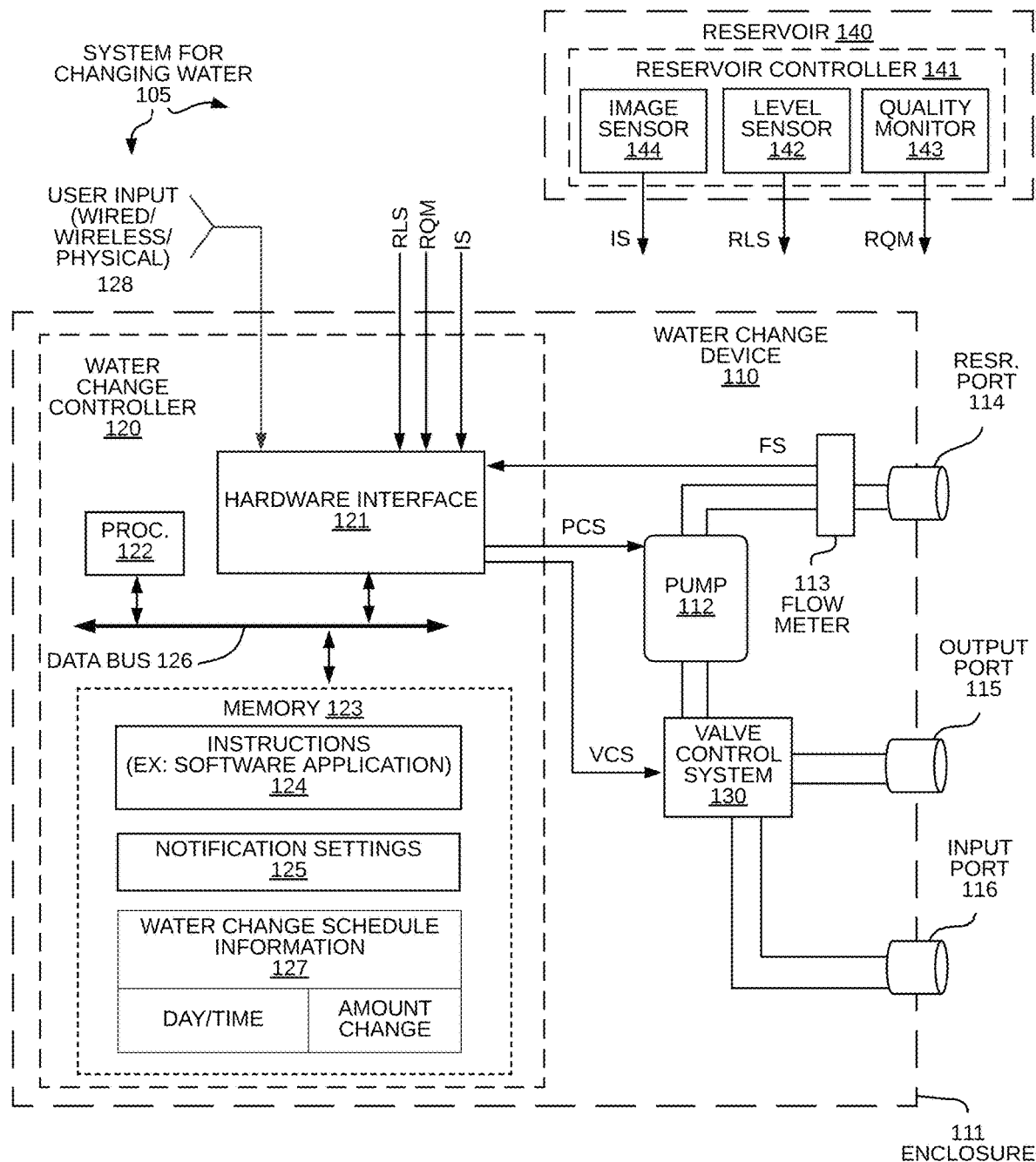
FIG. 1 is a block diagram of an embodiment of a system for changing water 105.

FIG. 1 is a block diagram of an embodiment of a system for changing water 105. System 105 comprises a water change device 110, and a reservoir 140. The water change device 110 performs automated water changing of liquid stored in reservoir 140. The water change device 110 comprises a water change controller 120, a pump 112, a valve control system 130, a flow meter 113, a reservoir port 114, an output port 115, an input port 116, and an enclosure 111. The water change controller 120 includes a processor 122, a memory 123, a hardware interface 121, and a data bus 126. The memory 123 stores an amount of computer readable instructions 124, notification settings information 125, and water change schedule information 127. The water change schedule information 127 is provided via user input 128. The water change device 110 performs water changing of reservoir 140 in accordance with the water change schedule 127 stored in memory 123.

The reservoir 140 is a tank or pond storing liquid that requires periodic fluid changes. In one embodiment, the reservoir 140 is a fresh or saltwater tank that provides an ecosystem to sustain aquatic life, such as fish. To ensure survival of fish, fluid within the tank 140 must be removed and replaced with new water. Fish tend to generate waste that is toxic and would eventually poison fish if not replaced with clean, non-toxic water. The water change device 110 facilitates water changes of the tank 140 with minimal user involvement.

A reservoir controller 141 is disposed within the reservoir 140. The reservoir controller 141 communicates with the water change controller 120 within the water change device 110. The reservoir controller 141 includes an image sensor 144, a level sensor 142, and a quality monitor 143. The image sensor 144 outputs and supplies image signal IS to the water change controller 120 via the hardware interface 121. The image signal IS is a digital signal that stores image or video information from inside the reservoir 140. The level sensor 142 outputs and supplies water level signal RLS to the water change controller 120 via the hardware interface 121. The water level signal RLS is a digital signal indicative of fluid level within the reservoir 140. The quality monitor 143 outputs and supplies water quality signal RQM to the water change controller 120 via the hardware interface 121. The water quality signal RQM is a digital signal indicative of quality of fluid within the reservoir 140.

The image sensor 144 is any suitable image sensing hardware that obtains image or video data. The image sensor 144 obtains image or video of inside the reservoir 140. In one example, the image sensor 144 provides image or video of inside the reservoir 140 and provides obtained image or video to the water change controller 120. The water change controller 120 provides the image or video to a user. In this way, the user is able to monitor and admire aquatic life within the reservoir water 105 remotely.

The level sensor 142 is any suitable hardware that detects information indicative of a fluid level within the reservoir 140. The water change controller 120 uses water level information to ensure that fluid within the reservoir 140 does not overflow.

The quality monitor 143 is any suitable hardware that detects a characteristic of fluid within the reservoir 140 indicative of quality. The quality monitor 143 detects at least one item selected from the group consisting of: temperature, salinity, ammonia, dissolved oxygen, nitrates, nitrites, and pH.

In operation, the water change device 110 performs water changes on the reservoir 140. A water change involves draining liquid stored in the reservoir 140 and adding new liquid into the reservoir 140. During a water change operation, liquid flows from the reservoir 140 into the reservoir port 114, through flow meter 113, through pump 112, through valve control system 130, and to a drain 118 via the output port 115. Next, liquid to be added to the reservoir 140 is received onto the input port 116, flows through valve control system 130, through pump 112, through flow meter 113 and into the reservoir via reservoir port 114. The flow meter 113 is any suitable hardware for detecting fluid flow through a conduit. In this example, the flow meter 113 generates and outputs a digital signal FS that is supplied to the water change controller 120 via the hardware interface 121. The control signal FS indicates a rate or amount of fluid that flows into or out of the reservoir 140 via the reservoir port 114.

The pump 112 is any hardware suitable to pump fluid between two bodies of fluid. The water change controller 120 generates and supplies a digital control signal PCS to the pump 112. The digital control signal PCS controls operation of the pump 112. In a reservoir draining mode, the digital control signal PCS controls pump 112 to pump fluid from reservoir port 114 to the valve control system 130 and out of the output port 115. In a reservoir filling mode, the digital control signal PCS controls pump 112 to pump fluid from the input port 116, through the valve control system 130 and into the reservoir 140 via the reservoir port 114.

The valve control system 130 includes any suitable hardware for selecting fluid flow between the pump 112 and either the output port 115 or the input port 116. The water change controller 120 generates and supplies a digital control signal VCS to the valve control system 130. The digital control signal VCS controls operation of the valve control system 130. In one embodiment, the valve control system 130 includes a diverter valve that toggles fluid flow between the pump 112 and either the output port 115 or the input port 116. In another embodiment, the valve control system 130 includes two digitally controlled valves that are switched on and off depending on which of the output port 115 or the input port 116 is to be coupled to the pump 112.

A source 117 supplies clean, non-toxic fluid to maintain a healthy environment for aquatic life within the reservoir 140.

The water change schedule information 127 is configured based on user input 128. The water change schedule information 127 indicates when water change operations are to be performed on the reservoir 140 and the amount of liquid to be swapped out of the reservoir 140. In this example, the water change schedule information 127 stores one or more day and times each with a corresponding amount of water to change in the reservoir 140. The user input 128 is supplied to the hardware interface 121 of the water change controller 120 via a wired or wireless connection or is input via a physical contact. In a wired connection embodiment, user input 128 is input into a dongle that connects to the water change controller 120 through a wired connection. In a wireless connection embodiment, user input 128 is input into a remote control that wirelessly communicates with the water change controller 120. In a physical contact embodiment, the water change device 110 includes buttons or a touch display that receives user input 128 that configures the water change controller 120.

The notification settings information 125 indicates how and when a user is to be notified. Notification settings information 125 includes information indicating trigger events such as fluid levels reaching certain thresholds or fluid quality reaching certain thresholds. Notification settings information 125 includes information indicating how a user is to be notified of a triggering event, such as by water change device 110 outputting a signal, such as light or sound, or via push notification, Short Message Service (SMS), Multimedia Messaging Service (MMS), email, or phone call.

The processor 122 is any suitable processor capable of interpreting or executing instructions. The hardware interface 121 is any suitable hardware capable of interfacing with input or output devices, including cameras, microphones, microcontrollers, processors, touch displays, wireless devices, sensors, actuators, heating elements, motors, pumps, network devices, and other auxiliary devices involved in perform water change operations. The memory 123 is a computer-readable medium that includes any kind of computer memory such as floppy disks, conventional hard disks, CD-ROMS, Flash ROMS, non-volatile ROM, RAM, and non-volatile memory. In operation, the processor 122 reads instructions 124 from memory 123 over data bus 126. In another embodiment, the memory 123 is external to the water change controller 120, such as cloud-based storage, and the processor 122 accesses the memory 123 over a network. In this embodiment, the instructions 124 are a software application. When executed or interpreted by the processor 122, the software application configures notification settings information 125 and water change schedule information 127 based on user input 128 and performs water changes of liquid stored in reservoir 140 in accordance with the water change schedule information 127.

Figure 2:
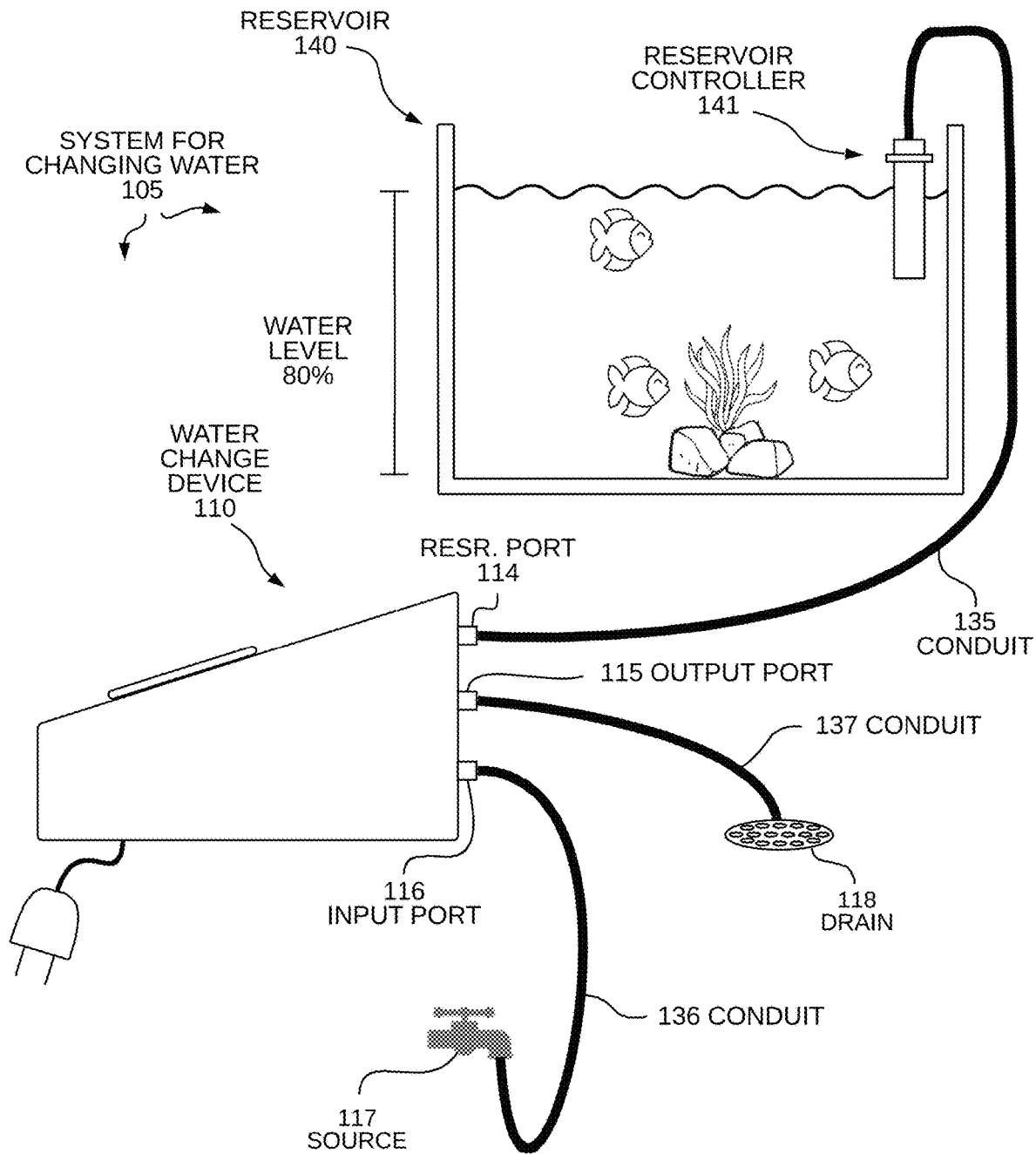
FIG. 2 is a diagram showing an exemplary assembly of the system for changing water 105.

FIG. 2 is a diagram showing an exemplary assembly of the system for changing water 105. The reservoir port 114 of the water change device 110 is coupled to the reservoir controller 141 via a conduit 135. The input port 116 of the water change device 110 is coupled to the source 117 via a conduit 136. The output port 115 of the water change device 110 is coupled to the drain 118 via a conduit 137. In the example of FIG. 2, the reservoir 140 has a water level of 80%.

Figure 3:
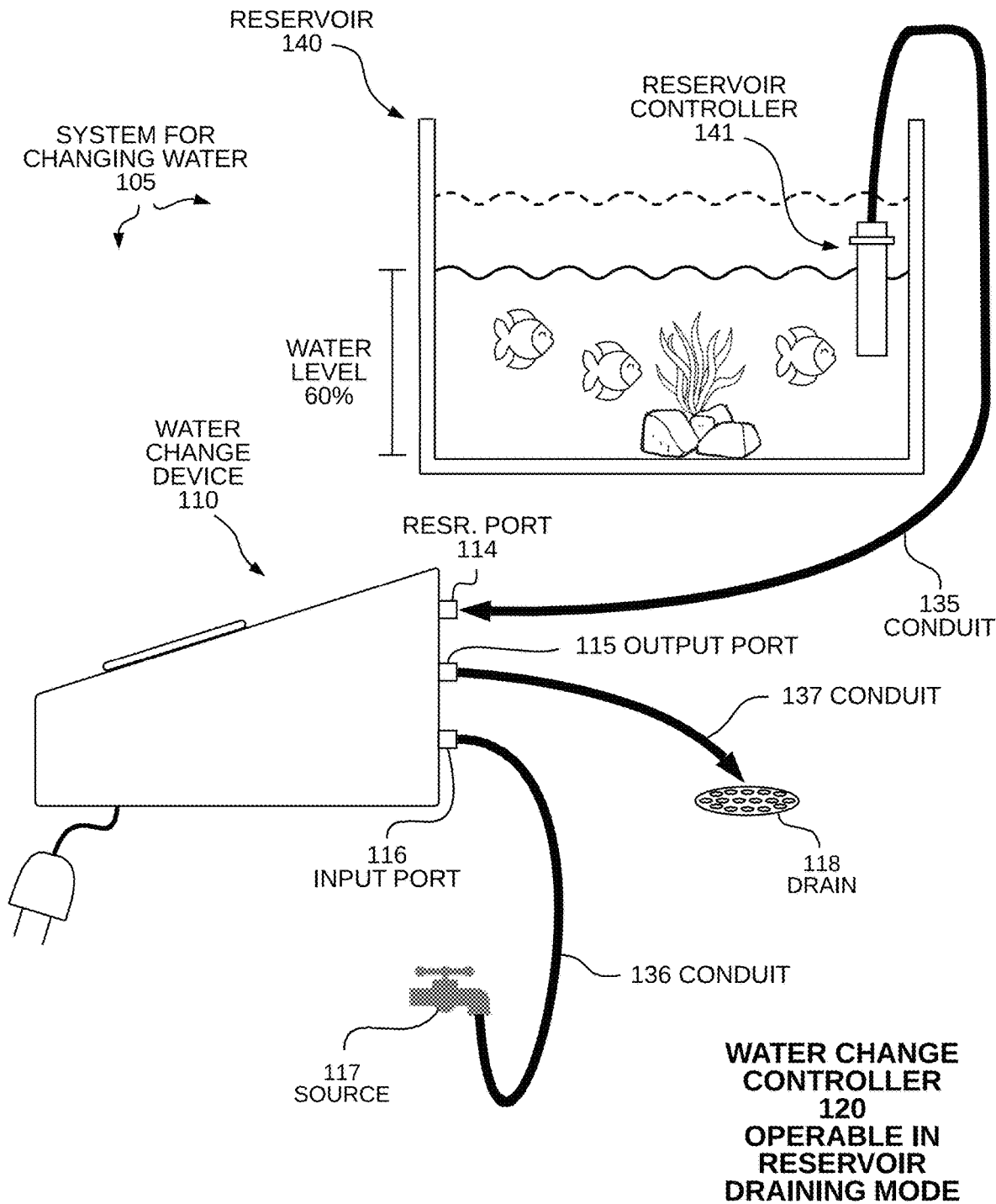
FIG. 3 is a diagram showing the system for changing water 105 when water change controller 120 is operable in the reservoir draining mode.

FIG. 3 is a diagram showing the system for changing water 105 when water change controller 120 is operable in the reservoir draining mode. In the reservoir draining mode, the pump 112 pumps fluid from the reservoir 140 into the reservoir port 114 of the water change device 110 via conduit 135. In the reservoir draining mode, the valve control system 130 prevents fluid from exiting through the input port 116 of the water change controller 120. Pump 112 pumps the fluid through the output port 115, and to the drain 118 via conduit 137. In the example of FIG. 3, the reservoir 140 has a water level of 60%.

Figure 4:
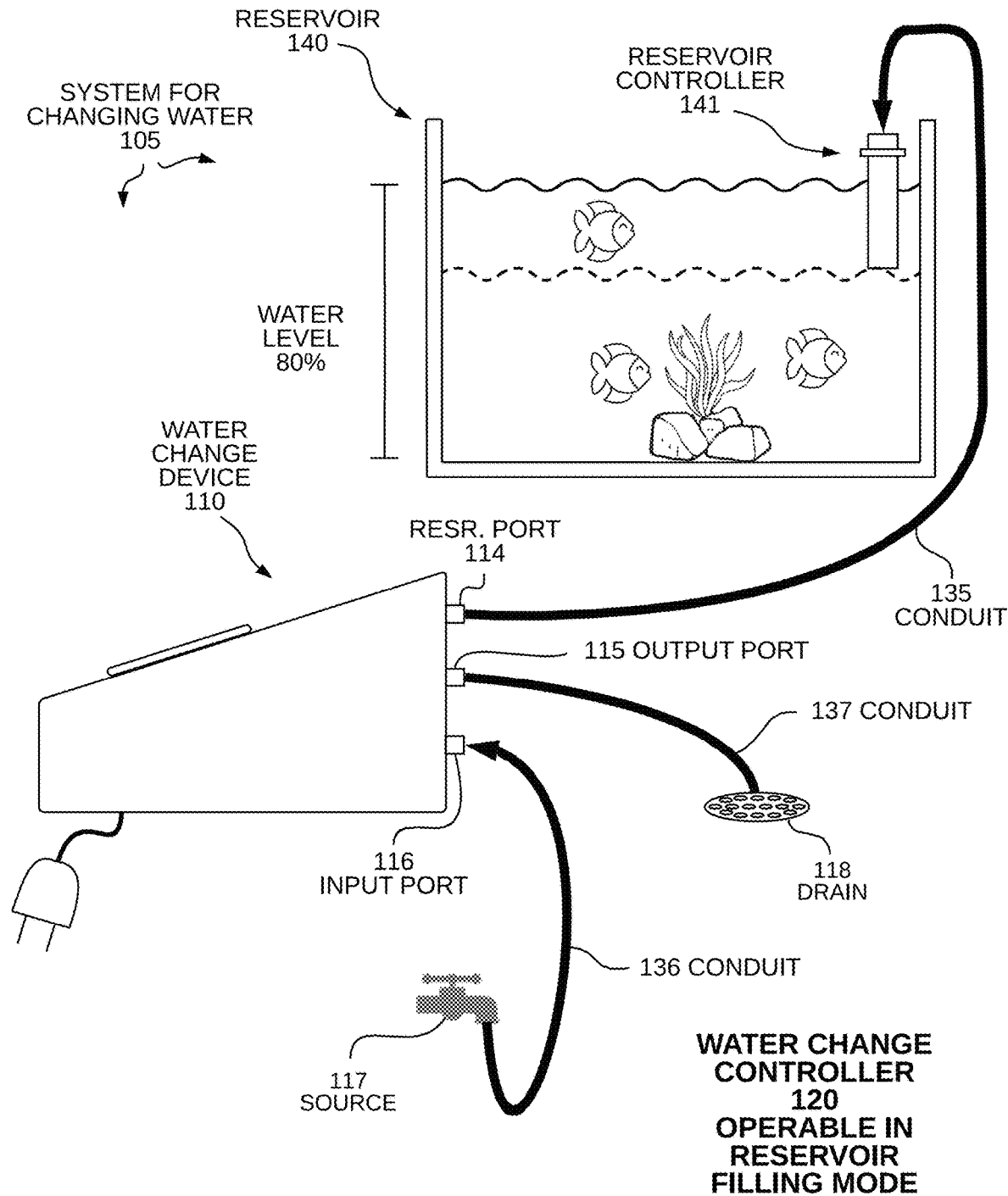
FIG. 4 is a diagram showing the system for changing water 105 when water change controller 120 is operable in the reservoir filling mode.

FIG. 4 is a diagram showing the system for changing water 105 when water change controller 120 is operable in the reservoir filling mode. In the reservoir filling mode, the pump 112 pumps fluid from the source 117 into the input port 116 of the water change device 110 via conduit 136. In the reservoir filling mode, the valve control system 130 prevents fluid from exiting through the output port 115 of the water change controller 120. Pump 112 pumps the fluid through the reservoir port 114, and into the reservoir 140 via conduit 135. In the example of FIG. 4, the reservoir 140 has a water level of 80%.

Figure 5:
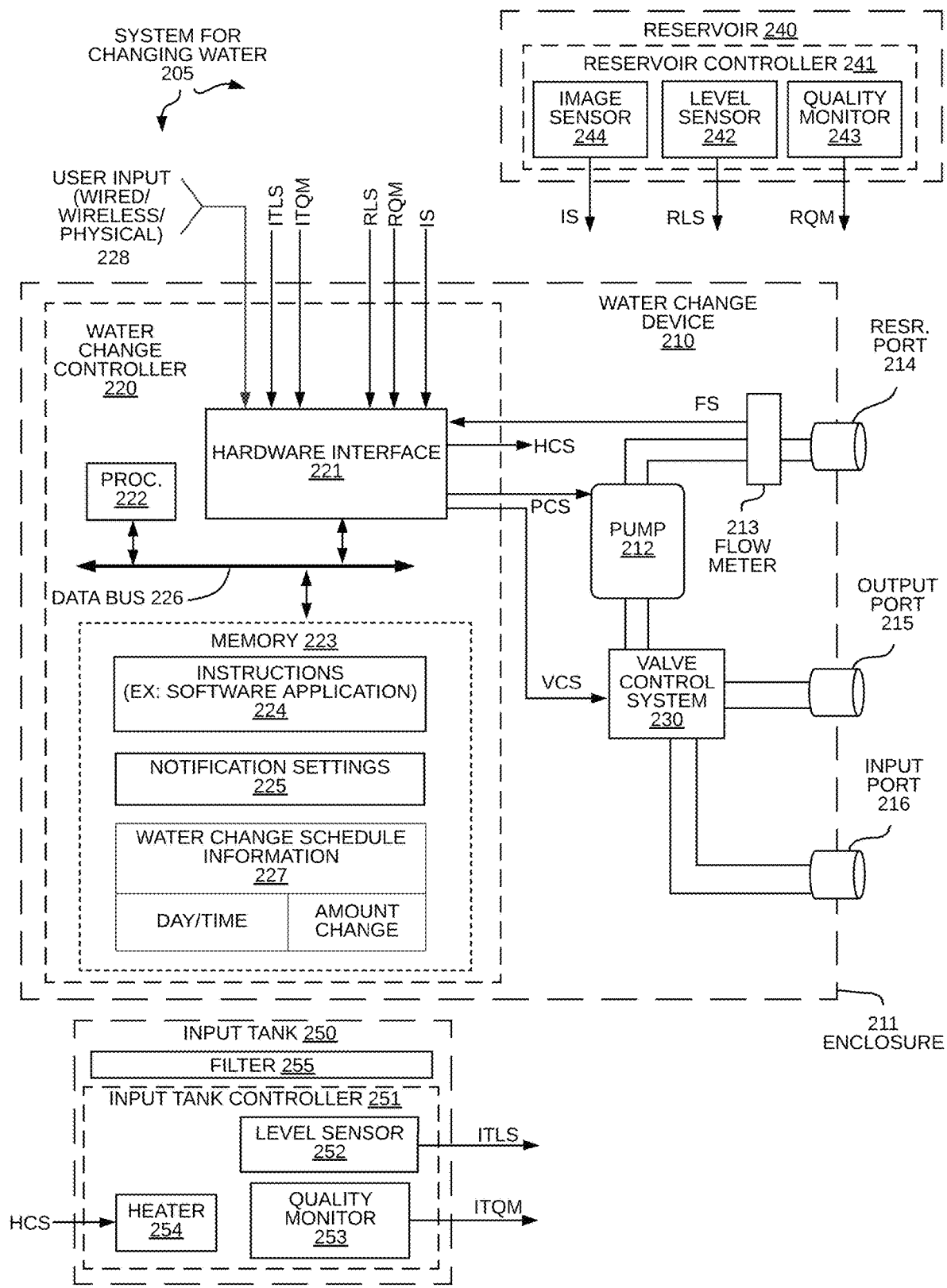
FIG. 5 is a block diagram of another embodiment of a system for changing water 205.

FIG. 5 is a block diagram of another embodiment of a system for changing water 205. System 205 comprises a water change device 210, a reservoir 240, and an input tank 250. The water change device 210 performs automated water changing of liquid stored in reservoir 240. The water change device 210 comprises a water change controller 220, a pump 212, a valve control system 230, a flow meter 213, a reservoir port 214, an output port 215, an input port 216, and an enclosure 211. The water change controller 220 includes a processor 222, a memory 223, a hardware interface 221, and a data bus 226. The memory 223 stores an amount of computer readable instructions 224, notification settings information 225, and water change schedule information 227. The water change schedule information 227 is provided via user input 228. The water change device 210 performs water changing of reservoir 240 in accordance with the water change schedule 227 stored in memory 223.

The reservoir 240 is a tank or pond storing liquid that requires periodic fluid changes. In one embodiment, the reservoir 240 is a fresh or saltwater tank that provides an ecosystem to sustain aquatic life, such as fish. To ensure survival of fish, fluid within the tank 240 must be removed and replaced with new water. Fish tend to generate waste that is toxic and would eventually poison fish if not replaced with clean, non-toxic water. The water change device 210 facilitates water changes of the tank 240 with minimal user involvement.

A reservoir controller 241 is disposed within the reservoir 240. The reservoir controller 241 communicates with the water change controller 220 within the water change device 210. The reservoir controller 241 includes an image sensor 244, a level sensor 242, and a quality monitor 243. The image sensor 244 outputs and supplies image signal IS to the water change controller 220 via the hardware interface 221. The image signal IS is a digital signal that stores image or video information from inside the reservoir 240. The level sensor 242 outputs and supplies water level signal RLS to the water change controller 220 via the hardware interface 221. The water level signal RLS is a digital signal indicative of fluid level within the reservoir 240. The quality monitor 243 outputs and supplies water quality signal RQM to the water change controller 220 via the hardware interface 221. The water quality signal RQM is a digital signal indicative of quality of fluid within the reservoir 240.

The image sensor 244 is any suitable image sensing hardware that obtains image or video data. The image sensor 244 obtains image or video of inside the reservoir 240. In one example, the image sensor 244 provides image or video of inside the reservoir 240 and provides obtained image or video to the water change controller 220. The water change controller 220 provides the image or video to a user. In this way, the user is able to monitor and admire aquatic life within the reservoir water 205 remotely.

The level sensor 242 is any suitable hardware that detects information indicative of a fluid level within the reservoir 240. The water change controller 220 uses water level information to ensure that fluid within the reservoir 240 does not overflow.

The quality monitor 243 is any suitable hardware that detects a characteristic of fluid within the reservoir 240 indicative of quality. The quality monitor 243 detects at least one item selected from the group consisting of: temperature, salinity, ammonia, dissolved oxygen, nitrates, nitrites, and pH.

In operation, the water change device 210 performs water changes on the reservoir 240. A water change involves draining liquid stored in the reservoir 240 and adding new liquid into the reservoir 240. During a water change operation, liquid flows from the reservoir 240 into the reservoir port 214, through flow meter 213, through pump 212, through valve control system 230, and to a drain 218 via the output port 215. Next, liquid to be added to the reservoir 240 is received onto the input port 216, flows through valve control system 230, through pump 212, through flow meter 213 and into the reservoir via reservoir port 214. The flow meter 213 is any suitable hardware for detecting fluid flow through a conduit. In this example, the flow meter 213 generates and outputs a digital signal FS that is supplied to the water change controller 220 via the hardware interface 221. The control signal FS indicates a rate or amount of fluid that flows into or out of the reservoir 240 via the reservoir port 214.

The pump 212 is any hardware suitable to pump fluid between two bodies of fluid. The water change controller 220 generates and supplies a digital control signal PCS to the pump 212. The digital control signal PCS controls operation of the pump 212. In a reservoir draining mode, the digital control signal PCS controls pump 212 to pump fluid from reservoir port 214 to the valve control system 230 and out of the output port 215. In a reservoir filling mode, the digital control signal PCS controls pump 212 to pump fluid from the input port 216, through the valve control system 230 and into the reservoir 240 via the reservoir port 214.

The valve control system 230 includes any suitable hardware for selecting fluid flow between the pump 212 and either the output port 215 or the input port 216. The water change controller 220 generates and supplies a digital control signal VCS to the valve control system 230. The digital control signal VCS controls operation of the valve control system 230. In one embodiment, the valve control system 230 includes a diverter valve that toggles fluid flow between the pump 212 and either the output port 215 or the input port 216. In another embodiment, the valve control system 230 includes two digitally controlled valves that are switched on and off depending on which of the output port 215 or the input port 216 is to be coupled to the pump 212.

The input tank 250 stores fluid that is to be supplied to the reservoir 240. The input tank 250 supplies clean, non-toxic fluid to maintain a healthy environment for aquatic life within the reservoir 240. An input tank controller 251 is disposed within the input tank 250. The input tank controller 251 communicates with the water change controller 220 within the water change device 210. The input tank controller 251 ensures that safe and non-hazardous fluid is available in the input tank 250 for supply to the reservoir 240.

The input tank controller 251 includes a heater 254, a filter 255, a level sensor 242, and a quality monitor 243. The heater 254 heats fluid within the input tank 250 such that fluid is delivered to the reservoir at a desired temperature. The water change device 210 controls the heater via a digital control signal HCS. The filter 255 filters fluid within the input tank 250 such that clean, non-toxic, and nutrient filled fluid is delivered to the reservoir. In one example, the filter 255 is any suitable filter, such as a carbon filter, sediment filter, or a Reverse Osmosis Deionization (RO/DI) filter. The level sensor 252 is any suitable hardware that detects information indicative of a fluid level within the input tank 250. The level sensor 252 generates and supplies a digital signal ITLS to the water change controller 220 via the hardware interface 221. The digital signal ITLS indicates a fluid level within the input tank 250. The water change controller 220 uses water level information to ensure that fluid within the input tank 250 does not overflow. The quality monitor 253 is any suitable hardware that detects a characteristic of fluid within the input tank 250 indicative of quality. The quality monitor 253 generates and outputs a digital control signal ITQM to the water change controller 220 via the hardware interface 221. The digital signal ITQM indicates quality of fluid within the input tank 250. The quality monitor 253 detects at least one item selected from the group consisting of: temperature, salinity, ammonia, dissolved oxygen, nitrates, nitrites, and pH. In one embodiment, the input tank 250 is manually filled with fluid. In another embodiment, the input tank 250 is coupled to a water source.

The water change schedule information 227 is configured based on user input 228. The water change schedule information 227 indicates when water change operations are to be performed on the reservoir 240 and the amount of liquid to be swapped out of the reservoir 240. In this example, the water change schedule information 227 stores one or more day and times each with a corresponding amount of water to change in the reservoir 240. The user input 228 is supplied to the hardware interface 221 of the water change controller 220 via a wired or wireless connection or is input via a physical contact. In a wired connection embodiment, user input 228 is input into a dongle that connects to the water change controller 220 through a wired connection. In a wireless connection embodiment, user input 228 is input into a remote control that wirelessly communicates with the water change controller 220. In a physical contact embodiment, the water change device 210 includes buttons or a touch display that receives user input 228 that configures the water change controller 220.

The notification settings information 225 indicates how and when a user is to be notified. Notification settings information 225 includes information indicating trigger events such as fluid levels reaching certain thresholds or fluid quality reaching certain thresholds. Notification settings information 225 includes information indicating how a user is to be notified of a triggering event, such as by water change device 210 outputting a signal, such as light or sound, or via push notification, Short Message Service (SMS), Multimedia Messaging Service (MMS), email, or phone call.

The processor 222 is any suitable processor capable of interpreting or executing instructions. The hardware interface 221 is any suitable hardware capable of interfacing with input or output devices, including cameras, microphones, microcontrollers, processors, touch displays, wireless devices, sensors, actuators, heating elements, motors, pumps, network devices, and other auxiliary devices involved in perform water change operations. The memory 223 is a computer-readable medium that includes any kind of computer memory such as floppy disks, conventional hard disks, CD-ROMS, Flash ROMS, non-volatile ROM, RAM, and non-volatile memory. In operation, the processor 222 reads instructions 224 from memory 223 over data bus 226. In another embodiment, the memory 223 is external to the water change controller 220, such as cloud-based storage, and the processor 222 accesses the memory 223 over a network. In this embodiment, the instructions 224 are a software application. When executed or interpreted by the processor 222, the software application configures notification settings information 225 and water change schedule information 227 based on user input 228 and performs water changes of liquid stored in reservoir 240 in accordance with the water change schedule information 227.

Figure 6:
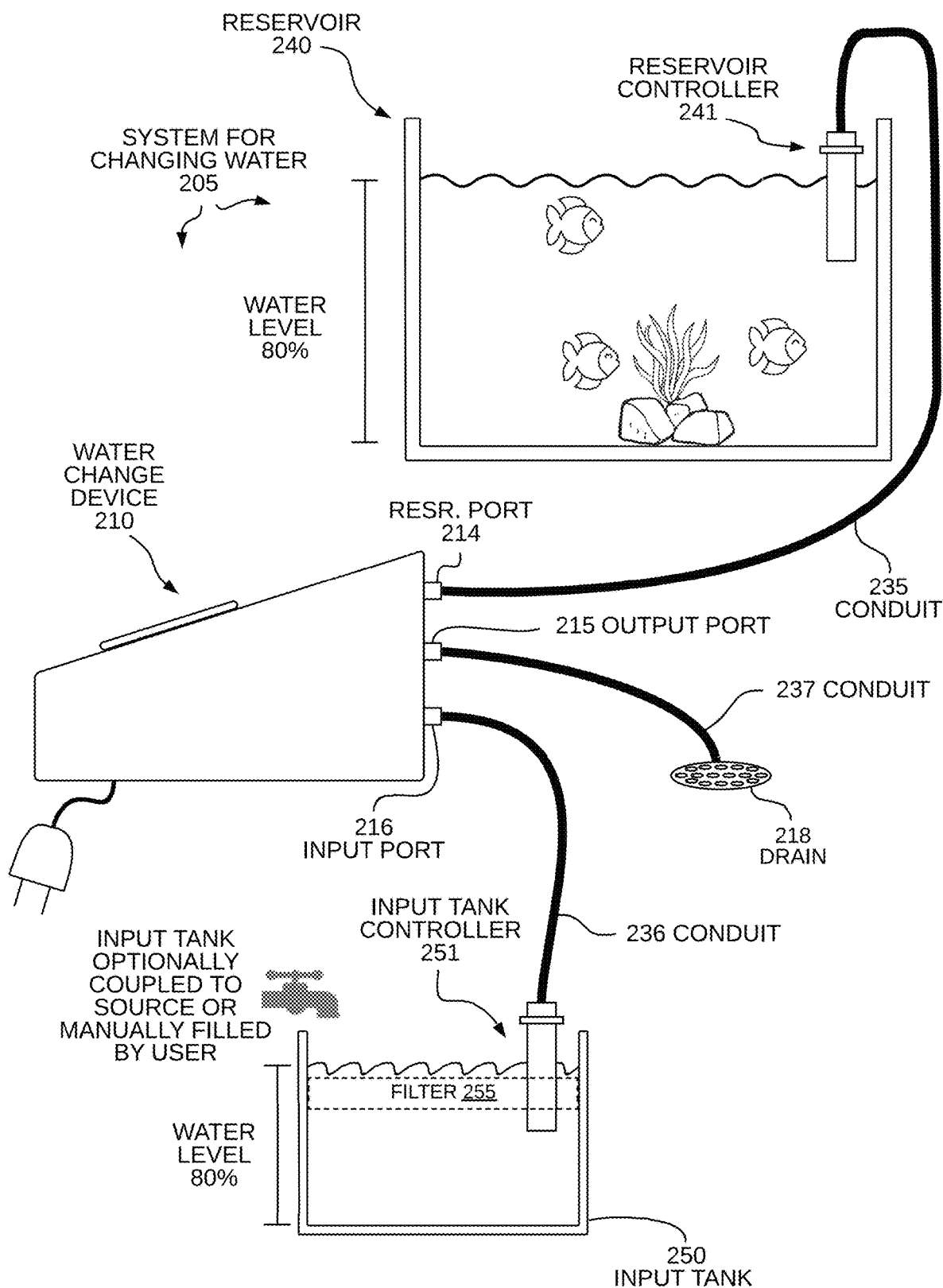
FIG. 6 is a diagram showing an exemplary assembly of the system for changing water 205.

FIG. 6 is a diagram showing an exemplary assembly of the system for changing water 205. The reservoir port 214 of the water change device 210 is coupled to the reservoir controller 241 via a conduit 235. The input port 216 of the water change device 210 is coupled to the input tank controller 251 via a conduit 236. The output port 215 of the water change device 210 is coupled to the drain 218 via a conduit 237. In the example of FIG. 6, the reservoir 240 has a water level of 80% and the input tank 250 has a water level of 80%.

Figure 7:
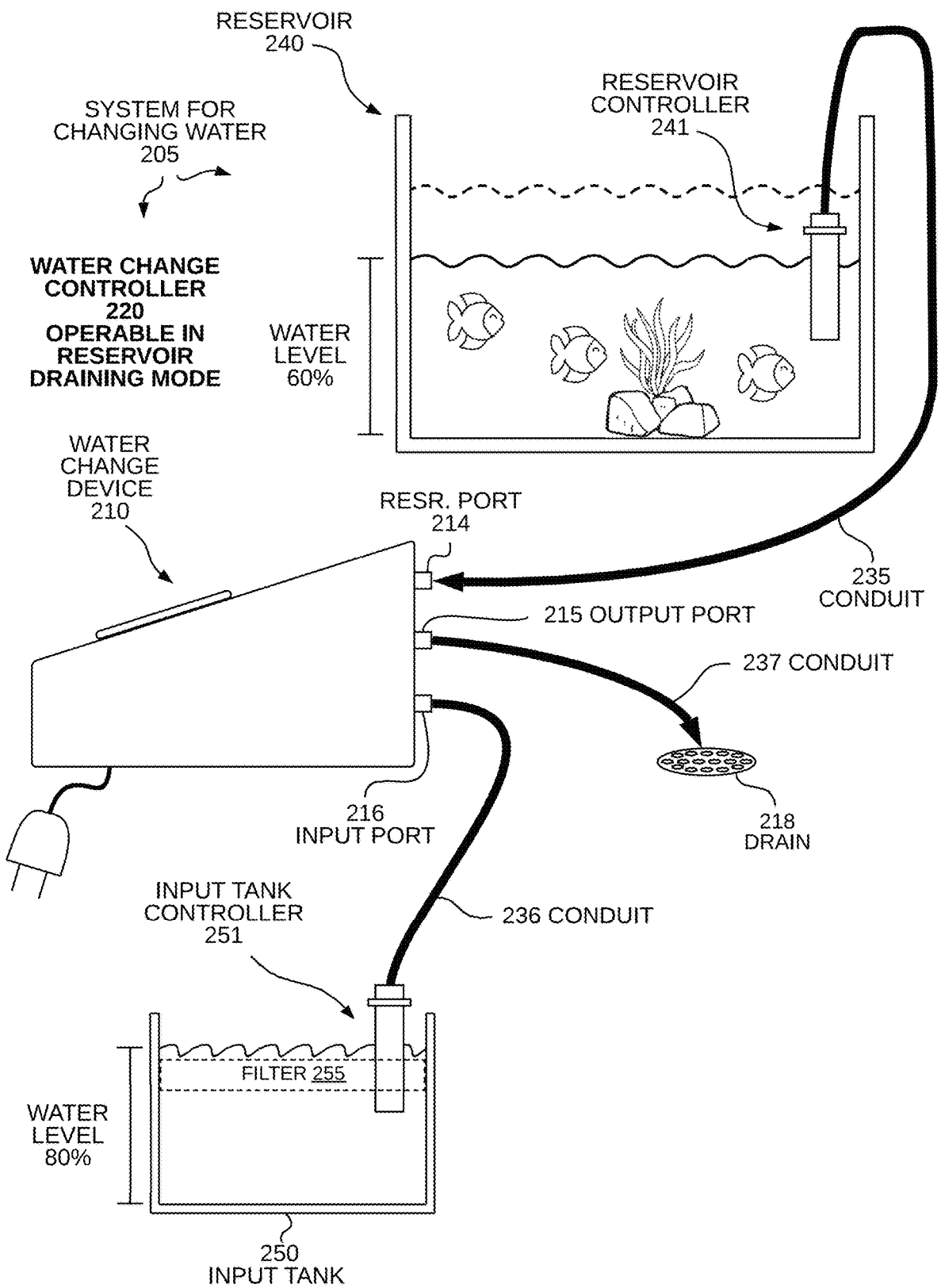
FIG. 7 is a diagram showing the system for changing water 205 when water change controller 220 is operable in the reservoir draining mode.

FIG. 7 is a diagram showing the system for changing water 205 when water change controller 220 is operable in the reservoir draining mode. In the reservoir draining mode, the pump 212 pumps fluid from the reservoir 240 into the reservoir port 214 of the water change device 210 via conduit 235. In the reservoir draining mode, the valve control system 230 prevents fluid from exiting through the input port 216 of the water change controller 220. Pump 212 pumps the fluid through the output port 215, and to the drain 218 via conduit 237. In the example of FIG. 7, the reservoir 240 has a water level of 60% and the input tank 250 has a water level of 80%.

Figure 8:
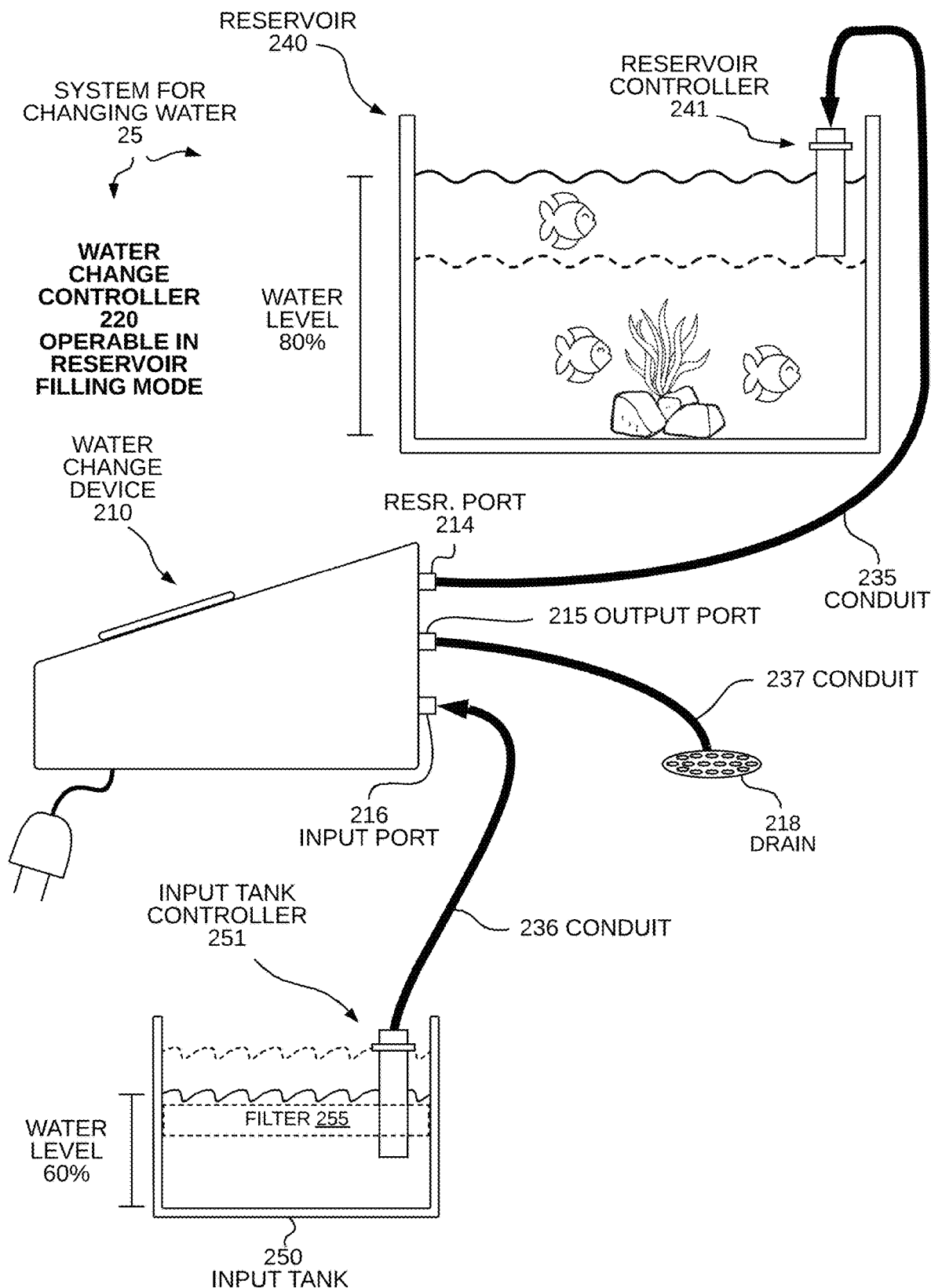
FIG. 8 is a diagram showing the system for changing water 205 when water change controller 220 is operable in the reservoir filling mode.

FIG. 8 is a diagram showing the system for changing water 205 when water change controller 220 is operable in the reservoir filling mode. In the reservoir filling mode, the pump 212 pumps fluid from the input tank 250 into the input port 216 of the water change device 210 via conduit 236. In the reservoir filling mode, the valve control system 230 prevents fluid from exiting through the output port 215 of the water change controller 220. pump 212 pumps the fluid through the reservoir port 214, and into the reservoir 240 via conduit 235. In the example of FIG. 8, the reservoir 240 has a water level of 80% and the input tank 250 has a water level of 60%.

Figure 9:
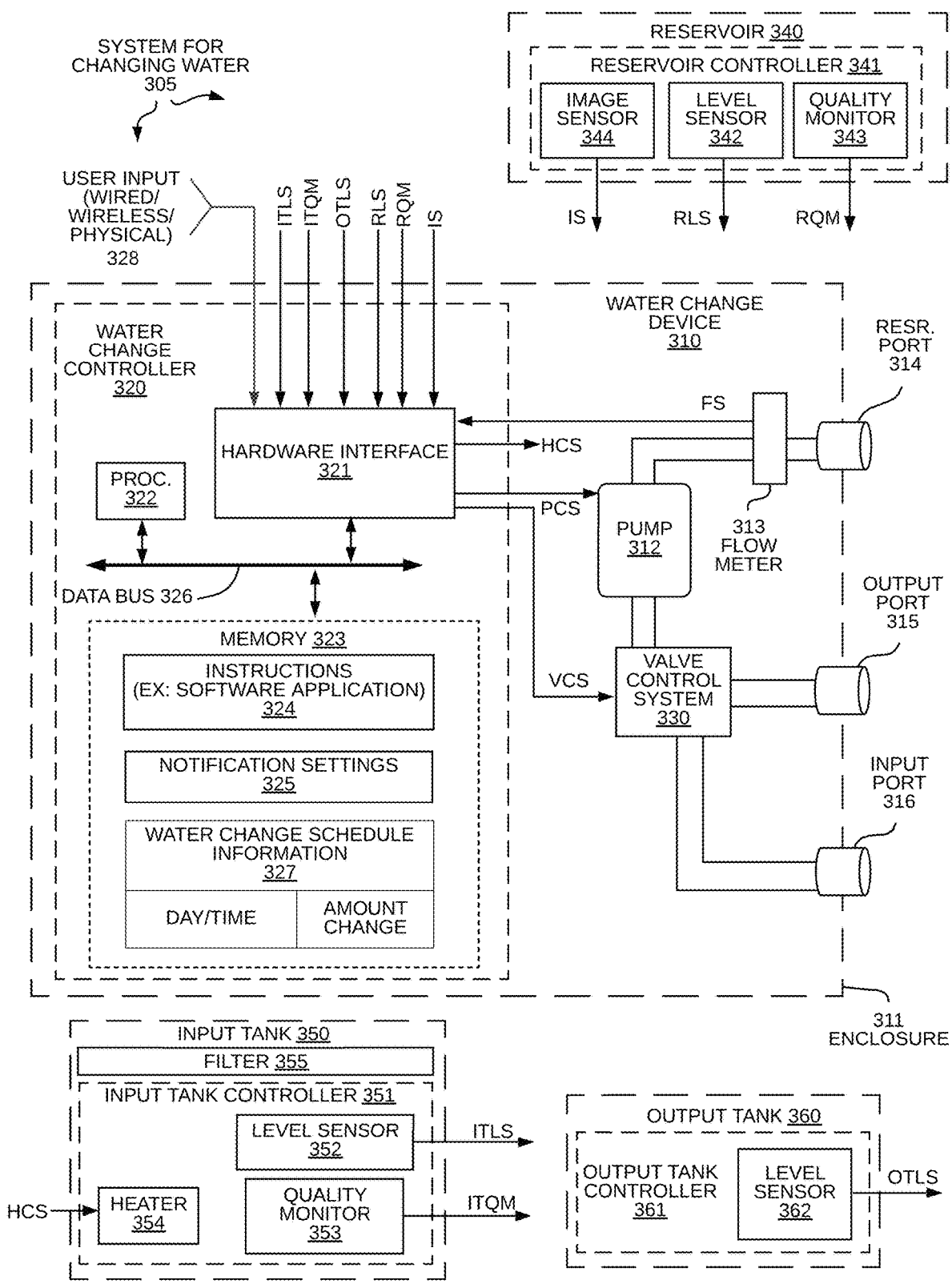
FIG. 9 is a block diagram of another embodiment of a system for changing water 305.

FIG. 9 is a block diagram of another embodiment of a system for changing water 305. System 305 comprises a water change device 310, a reservoir 340, an input tank 350, and an output tank 360. The water change device 310 performs automated water changing of liquid stored in reservoir 340. The water change device 310 comprises a water change controller 320, a pump 312, a valve control system 330, a flow meter 313, a reservoir port 314, an output port 315, an input port 316, and an enclosure 311. The water change controller 320 includes a processor 322, a memory 323, a hardware interface 321, and a data bus 326. The memory 323 stores an amount of computer readable instructions 324, notification settings information 325, and water change schedule information 327. The water change schedule information 327 is provided via user input 328. The water change device 310 performs water changing of reservoir 340 in accordance with the water change schedule 327 stored in memory 323.

The reservoir 340 is a tank or pond storing liquid that requires periodic fluid changes. In one embodiment, the reservoir 340 is a fresh or saltwater tank that provides an ecosystem to sustain aquatic life, such as fish. To ensure survival of fish, fluid within the tank 340 must be removed and replaced with new water. Fish tend to generate waste that is toxic and would eventually poison fish if not replaced with clean, non-toxic water. The water change device 310 facilitates water changes of the tank 340 with minimal user involvement.

A reservoir controller 341 is disposed within the reservoir 340. The reservoir controller 341 communicates with the water change controller 320 within the water change device 310. The reservoir controller 341 includes an image sensor 344, a level sensor 342, and a quality monitor 343. The image sensor 344 outputs and supplies image signal IS to the water change controller 320 via the hardware interface 321. The image signal IS is a digital signal that stores image or video information from inside the reservoir 340. The level sensor 342 outputs and supplies water level signal RLS to the water change controller 320 via the hardware interface 321. The water level signal RLS is a digital signal indicative of fluid level within the reservoir 340. The quality monitor 343 outputs and supplies water quality signal RQM to the water change controller 320 via the hardware interface 321. The water quality signal RQM is a digital signal indicative of quality of fluid within the reservoir 340.

The image sensor 344 is any suitable image sensing hardware that obtains image or video data. The image sensor 344 obtains image or video of inside the reservoir 340. In one example, the image sensor 344 provides image or video of inside the reservoir 340 and provides obtained image or video to the water change controller 320. The water change controller 320 provides the image or video to a user. In this way, the user is able to monitor and admire aquatic life within the reservoir water 305 remotely.

The level sensor 342 is any suitable hardware that detects information indicative of a fluid level within the reservoir 340. The water change controller 320 uses water level information to ensure that fluid within the reservoir 340 does not overflow.

The quality monitor 343 is any suitable hardware that detects a characteristic of fluid within the reservoir 340 indicative of quality. The quality monitor 343 detects at least one item selected from the group consisting of: temperature, salinity, ammonia, dissolved oxygen, nitrates, nitrites, and pH.

In operation, the water change device 310 performs water changes on the reservoir 340. A water change involves draining liquid stored in the reservoir 340 and adding new liquid into the reservoir 340. During a water change operation, liquid flows from the reservoir 340 into the reservoir port 314, through flow meter 313, through pump 312, through valve control system 330, and into the output tank 360 via the output port 315. Next, liquid to be added to the reservoir 340 is received onto the input port 316, flows through valve control system 330, through pump 312, through flow meter 313 and into the reservoir via reservoir port 314. The flow meter 313 is any suitable hardware for detecting fluid flow through a conduit. In this example, the flow meter 313 generates and outputs a digital signal FS that is supplied to the water change controller 320 via the hardware interface 321. The control signal FS indicates a rate or amount of fluid that flows into or out of the reservoir 340 via the reservoir port 314.

The pump 312 is any hardware suitable to pump fluid between two bodies of fluid. The water change controller 320 generates and supplies a digital control signal PCS to the pump 312. The digital control signal PCS controls operation of the pump 312. In a reservoir draining mode, the digital control signal PCS controls pump 312 to pump fluid from reservoir port 314 to the valve control system 330 and out of the output port 315. In a reservoir filling mode, the digital control signal PCS controls pump 312 to pump fluid from the input port 316, through the valve control system 330 and into the reservoir 340 via the reservoir port 314.

The valve control system 330 includes any suitable hardware for selecting fluid flow between the pump 312 and either the output port 315 or the input port 316. The water change controller 320 generates and supplies a digital control signal VCS to the valve control system 330. The digital control signal VCS controls operation of the valve control system 330. In one embodiment, the valve control system 330 includes a diverter valve that toggles fluid flow between the pump 312 and either the output port 315 or the input port 316. In another embodiment, the valve control system 330 includes two digitally controlled valves that are switched on and off depending on which of the output port 315 or the input port 316 is to be coupled to the pump 312.

The input tank 350 stores fluid that is to be supplied to the reservoir 340. The input tank 350 supplies clean, non-toxic fluid to maintain a healthy environment for aquatic life within the reservoir 340. An input tank controller 351 is disposed within the input tank 350. The input tank controller 351 communicates with the water change controller 320 within the water change device 310. The input tank controller 351 ensures that safe and non-hazardous fluid is available in the input tank 350 for supply to the reservoir 340.

The input tank controller 351 includes a heater 354, a filter 355, a level sensor 342, and a quality monitor 343. The heater 354 heats fluid within the input tank 350 such that fluid is delivered to the reservoir at a desired temperature. The water change device 310 controls the heater via a digital control signal HCS. The filter 355 filters fluid within the input tank 350 such that clean, non-toxic, and nutrient filled fluid is delivered to the reservoir. In one example, the filter 355 is any suitable filter, such as a carbon filter, sediment filter, or a Reverse Osmosis Deionization (RO/DI) filter. The level sensor 352 is any suitable hardware that detects information indicative of a fluid level within the input tank 350. The level sensor 352 generates and supplies a digital signal ITLS to the water change controller 320 via the hardware interface 321. The digital signal ITLS indicates a fluid level within the input tank 350. The water change controller 320 uses water level information to ensure that fluid within the input tank 350 does not overflow. The quality monitor 353 is any suitable hardware that detects a characteristic of fluid within the input tank 350 indicative of quality. The quality monitor 353 generates and outputs a digital control signal ITQM to the water change controller 320 via the hardware interface 321. The digital signal ITQM indicates quality of fluid within the input tank 350. The quality monitor 353 detects at least one item selected from the group consisting of: temperature, salinity, ammonia, dissolved oxygen, nitrates, nitrites, and pH. In one embodiment, the input tank 350 is manually filled with fluid. In another embodiment, the input tank 350 is coupled to a water source.

The output tank 360 stores fluid drained from reservoir 340. An output tank controller 361 is disposed within the output tank 360. The output tank controller 361 communicates with the water change controller 320 within the water change device 310. The output tank controller 361 ensures that water is drainable from the reservoir 340 without direct drain access. Embodiments that involve the output tank 360 are particularly suited to housing environments where a drain is not readily accessible, such as in one type of residential apartment.

The output tank controller 361 includes a level sensor 362. The level sensor is any suitable hardware that detects information indicative of a fluid level within the output tank 360. The level sensor 362 generates and supplies a digital signal OTLS to the water change controller 320 via the hardware interface 321. The digital signal OTLS indicates a fluid level within the output tank 360. The water change controller 320 uses water level information to ensure that fluid within the output tank 360 does not overflow. In one embodiment, the output tank 360 is drained manually. In another embodiment, the output tank 360 is coupled to a drain.

The water change schedule information 327 is configured based on user input 328. The water change schedule information 327 indicates when water change operations are to be performed on the reservoir 340 and the amount of liquid to be swapped out of the reservoir 340. In this example, the water change schedule information 327 stores one or more day and times each with a corresponding amount of water to change in the reservoir 340. The user input 328 is supplied to the hardware interface 321 of the water change controller 320 via a wired or wireless connection or is input via a physical contact. In a wired connection embodiment, user input 328 directly connects to the water change controller 320 through a wired connection. The wired connection is any suitable wired data connection that supports data transfer, such as USB or ethernet. In a wireless connection embodiment, user input 328 is input into a remote control that wirelessly communicates with the water change controller 320. In a physical contact embodiment, the water change device 310 includes buttons or a touch display that receives user input 328 that configures the water change controller 320.

The notification settings information 325 indicates how and when a user is to be notified. Notification settings information 325 includes information indicating trigger events such as fluid levels reaching certain thresholds or fluid quality reaching certain thresholds. Notification settings information 325 includes information indicating how a user is to be notified of a triggering event, such as by water change device 310 outputting a signal, such as light or sound, or via a push notification, Short Message Service (SMS), Multimedia Messaging Service (MMS), email, or phone call.

The processor 322 is any suitable processor capable of interpreting or executing instructions. The hardware interface 321 is any suitable hardware capable of interfacing with input or output devices, including cameras, microphones, microcontrollers, processors, touch displays, wireless devices, sensors, actuators, heating elements, motors, pumps, network devices, and other auxiliary devices involved in perform water change operations. The memory 323 is a computer-readable medium that includes any kind of computer memory such as floppy disks, conventional hard disks, CD-ROMS, Flash ROMS, non-volatile ROM, RAM, and non-volatile memory. In operation, the processor 322 reads instructions 324 from memory 323 over data bus 326. In another embodiment, the memory 323 is external to the water change controller 320, such as cloud-based storage, and the processor 322 accesses the memory 323 over a network. In this embodiment, the instructions 324 are a software application. When executed or interpreted by the processor 322, the software application configures notification settings information 325 and water change schedule information 327 based on user input 328 and performs water changes of liquid stored in reservoir 340 in accordance with the water change schedule information 327.

Figure 10:
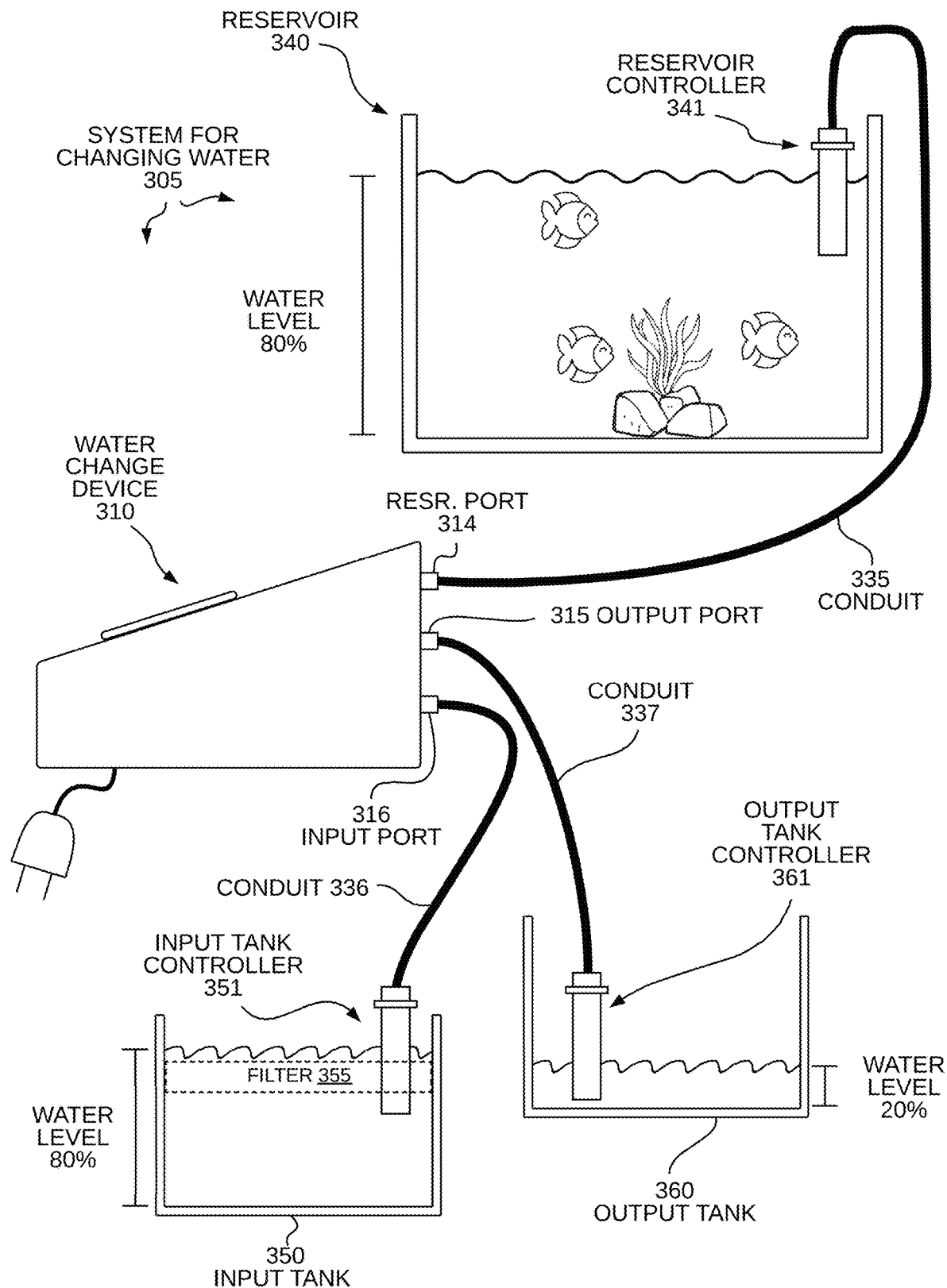
FIG. 10 is a diagram showing an exemplary assembly of the system for changing water 305.

FIG. 10 is a diagram showing an exemplary assembly of the system for changing water 305. The reservoir port 314 of the water change device 310 is coupled to the reservoir controller 341 via a conduit 335. The input port 316 of the water change device 310 is coupled to the input tank controller 351 via a conduit 336. The output port 315 of the water change device 310 is coupled to the output tank controller 361 via a conduit 337. In the example of FIG. 10, the reservoir 340 has a water level of 80%, the input tank 350 has a water level of 80%, and the output tank 360 has a water level of 20%.

Figure 11:
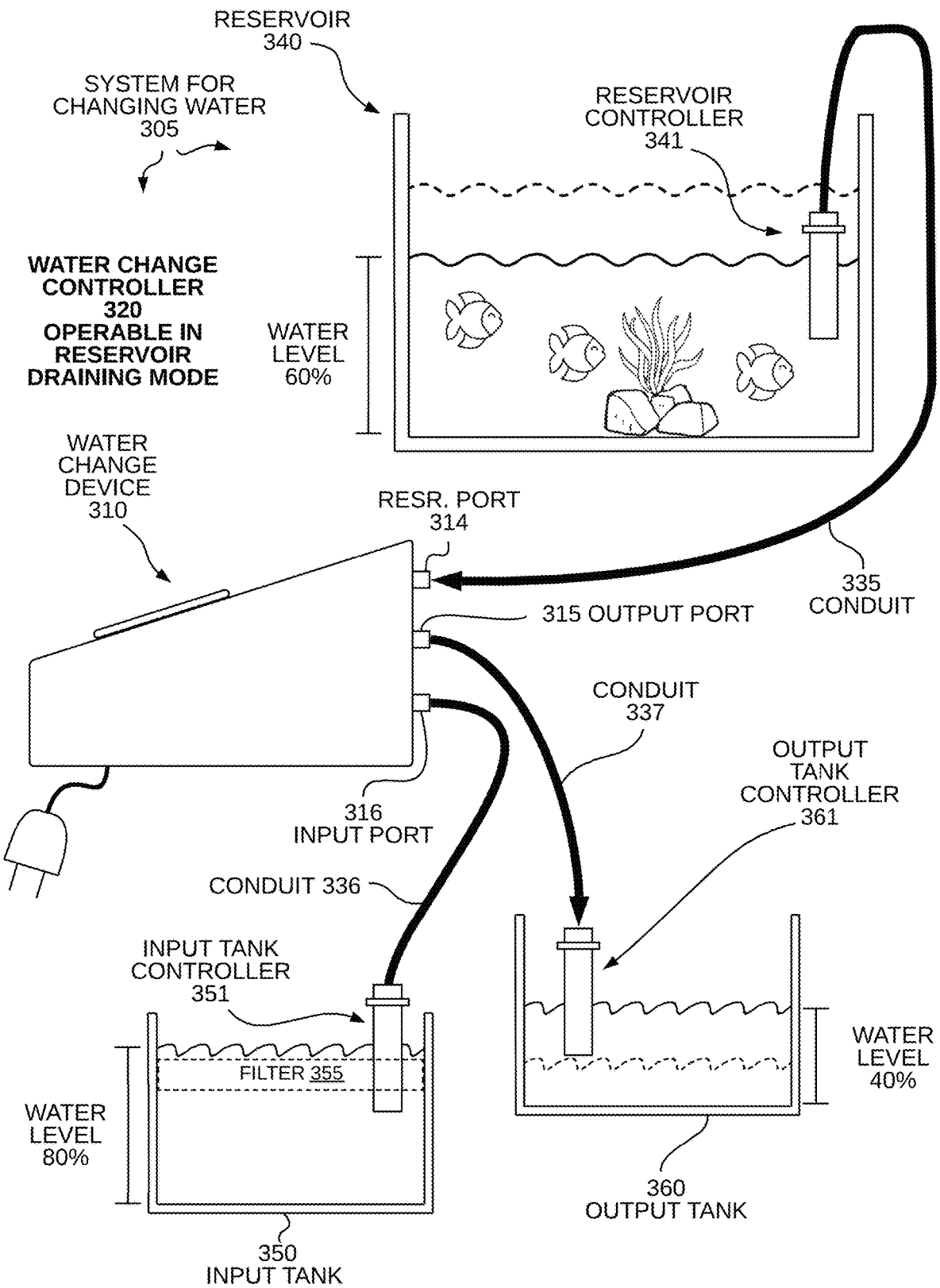
FIG. 11 is a diagram showing the system for changing water 305 when water change controller 320 is operable in the reservoir draining mode.

FIG. 11 is a diagram showing the system for changing water 305 when water change controller 320 is operable in the reservoir draining mode. In the reservoir draining mode, the pump 312 pumps fluid from the reservoir 340 into the reservoir port 314 of the water change device 310 via conduit 335. In the reservoir draining mode, the valve control system 330 prevents fluid from exiting through the input port 316 of the water change controller 320. Pump 312 pumps the fluid through the output port 315, and into the output tank 360 via conduit 337. In the example of FIG. 11, the reservoir 340 has a water level of 60%, the input tank 350 has a water level of 80%, and the output tank 360 has a water level of 40%.

Figure 12:
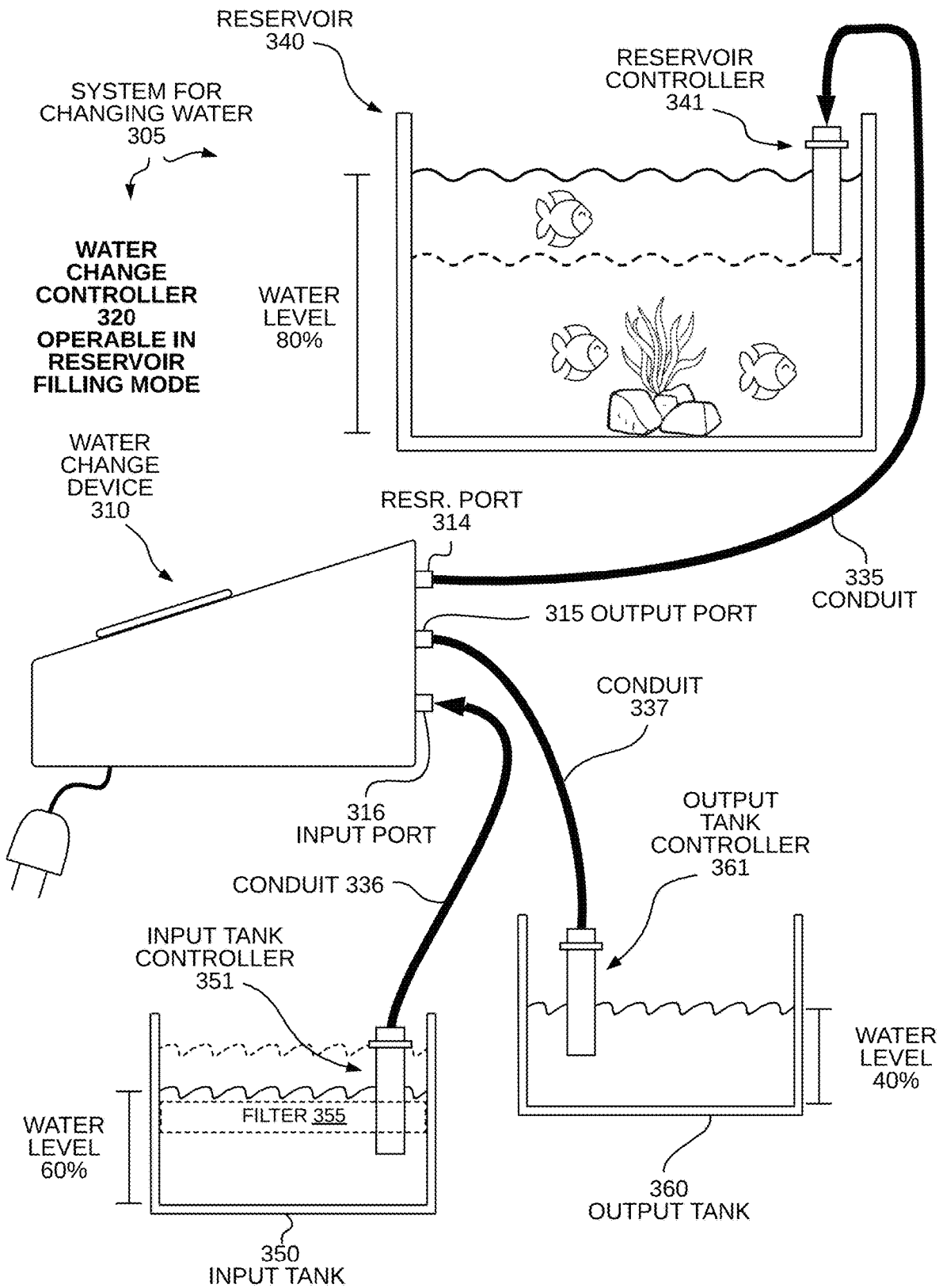
FIG. 12 is a diagram showing the system for changing water 305 when water change controller 320 is operable in the reservoir filling mode.

FIG. 12 is a diagram showing the system for changing water 305 when water change controller 320 is operable in the reservoir filling mode. In the reservoir filling mode, the pump 312 pumps fluid from the input tank 350 into the input port 316 of the water change device 310 via conduit 336. In the reservoir filling mode, the valve control system 330 prevents fluid from exiting through the output port 315 of the water change controller 320. pump 312 pumps the fluid through the reservoir port 314, and into the reservoir 340 via conduit 335. In the example of FIG. 12, the reservoir 340 has a water level of 80%, the input tank 350 has a water level of 60%, and the output tank 360 has a water level of 40%.

Figure 13:
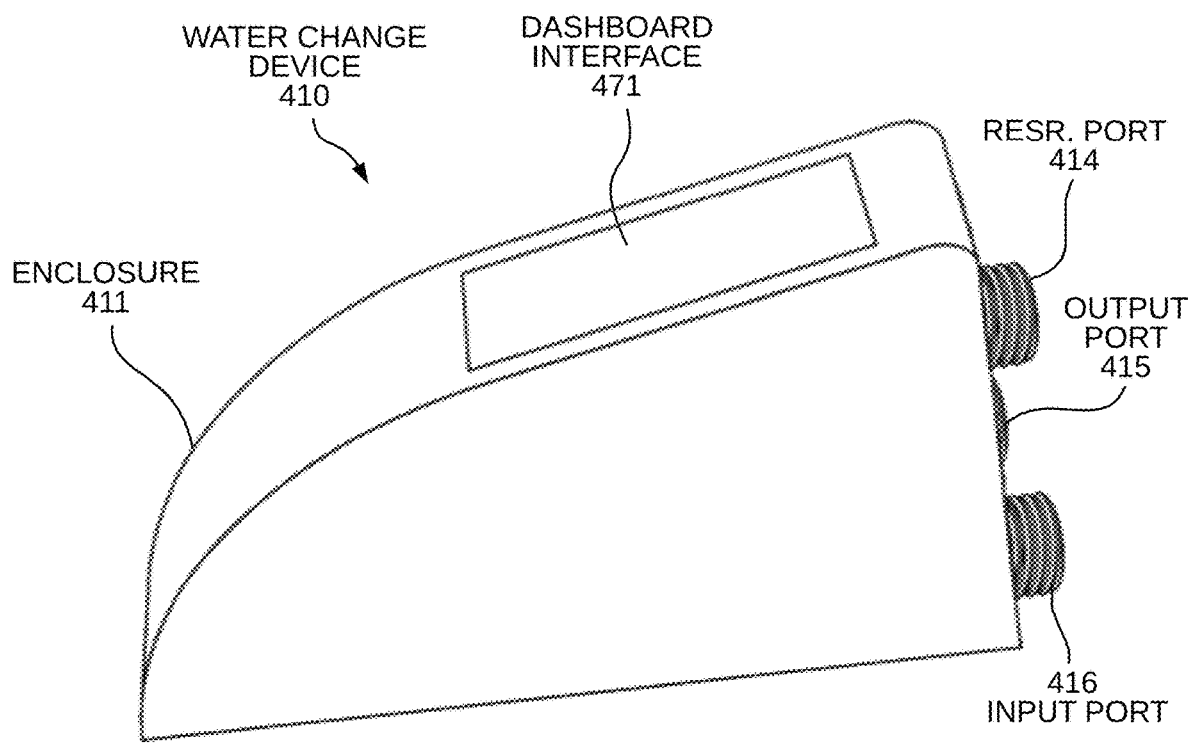
FIG. 13 shows a perspective view of an exemplary water change device 410.

FIG. 13 shows a perspective view of an exemplary water change device 410. In this example, device 410 includes an enclosure 411, an interface 471, a reservoir port 414, an output port 415, and an input port 416. The water change device 410 may be any of the water change devices 110, 210, or 310.

Figure 14:
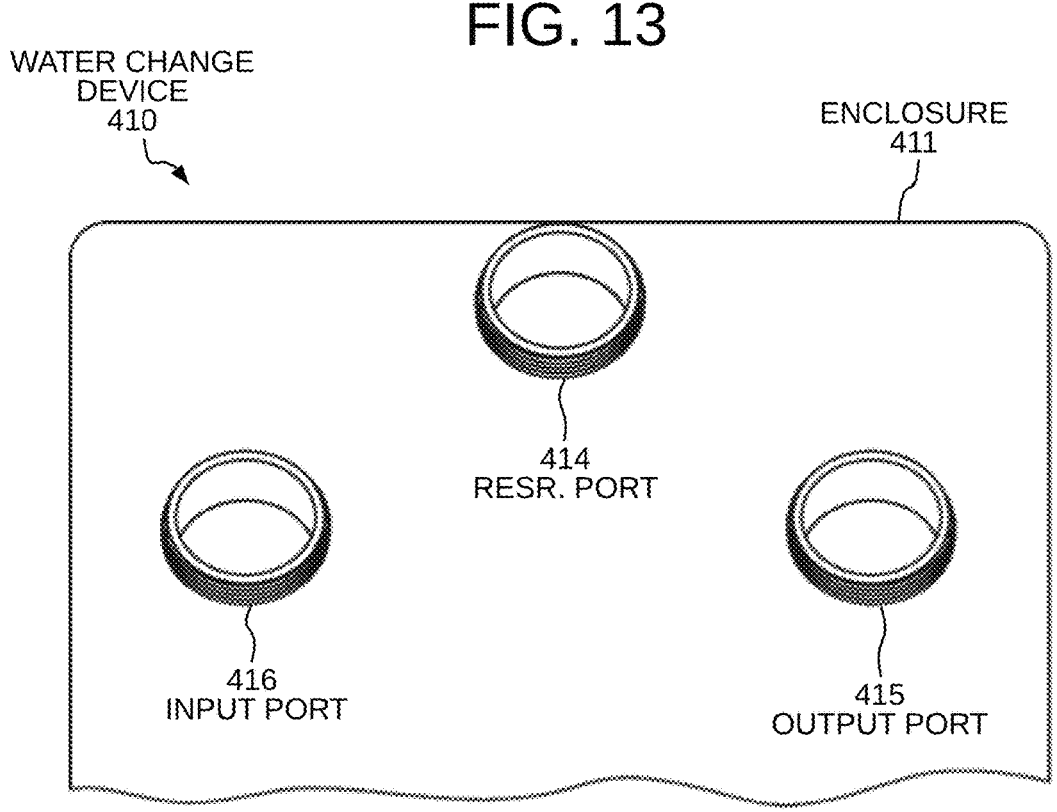
FIG. 14 shows a back view of the water change device 410.

FIG. 14 shows a back view of the water change device 410. The example of FIG. 14 shows one way to arrange ports 414-416 of device 410. The location of the ports 414-416, can be configured in different arrangements. In one example, ports 414-416, are arranged vertically. In another example, ports 414-416, are located on different sides of the enclosure 411.

Figure 15:
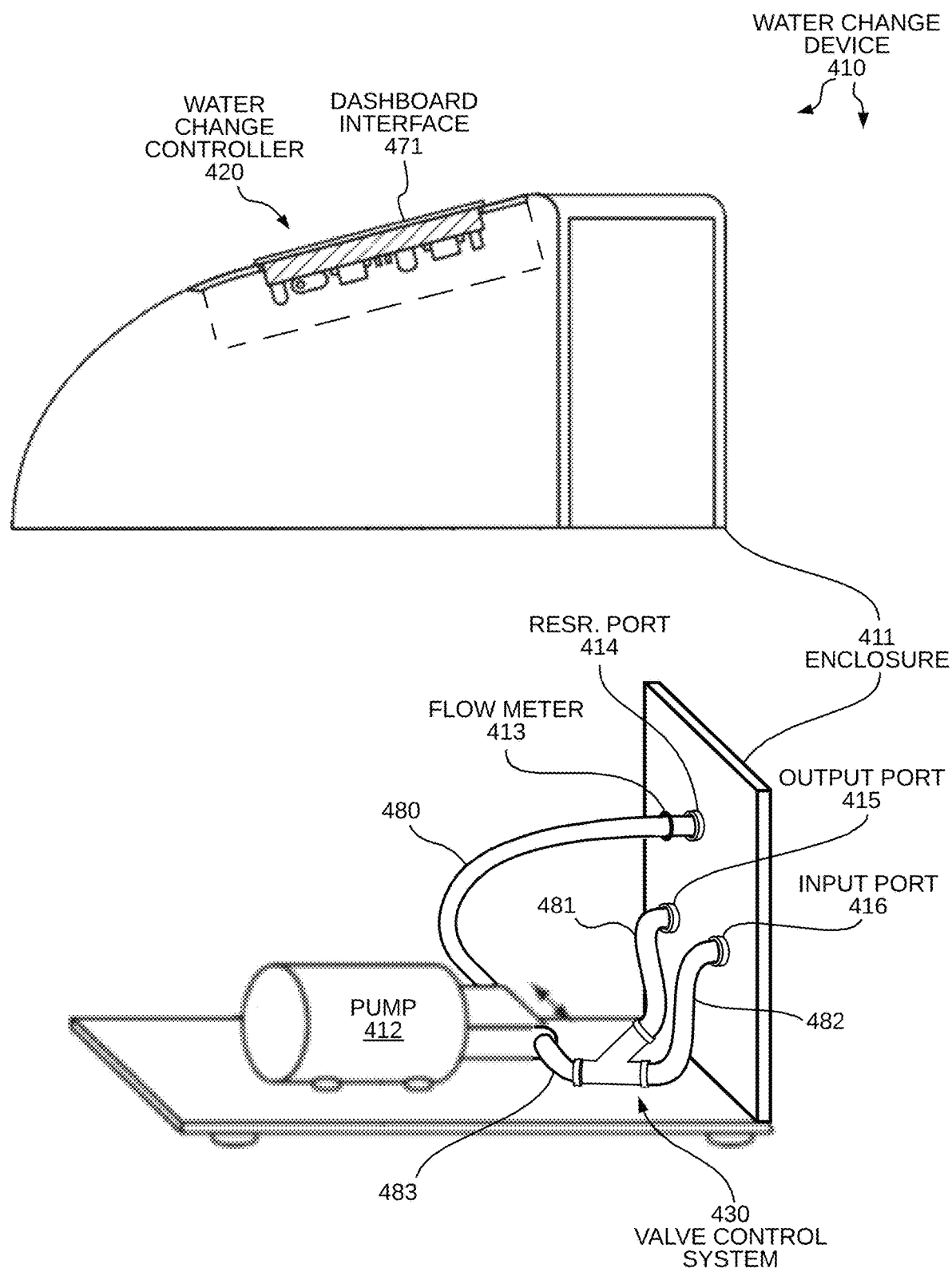
FIG. 15 is an exploded view of the water change device 410.

FIG. 15 is an exploded view of the water change device 410. The water change device 410 comprises a water change controller 420, a pump 412, a flow meter 413, a reservoir port 414, an output port 415, an input port 416, an enclosure 411, and a valve control system 430. It is appreciated that in actual implementation power electronics circuitry is involved in operation of the device 410 but is intentionally omitted from FIG. 15 for purposes of simplifying explanation.

FIG. 15 shows the pump 412 coupled to the reservoir port 414 via conduit 480. In one embodiment, the valve control system 430 of the water change device 410 includes a diverter valve 431 (see FIG. 16). The diverter valve 431 directs fluid flow between the pump 412 and either the output port 415 or the input port 416.

Figure 17:
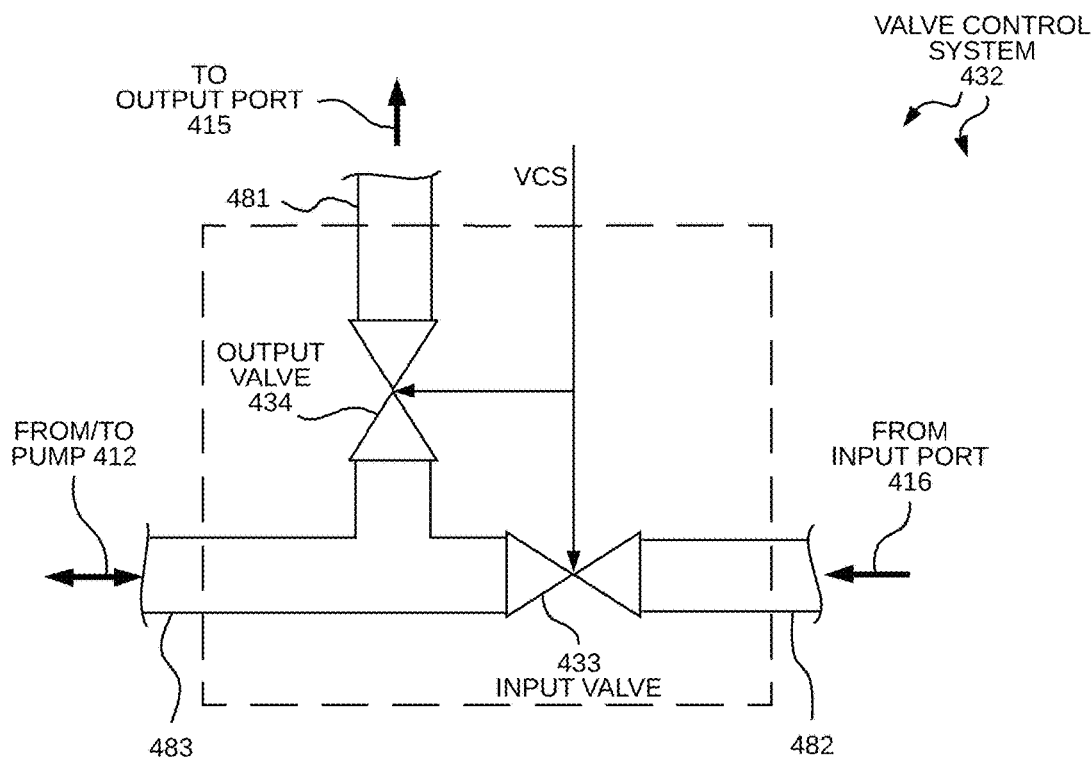
FIG. 17 shows a diagram of the valve control system 432.

In another embodiment, the water change device 410 includes valve control system 432 comprising an input valve 433 and an output valve 434 that are opened or closed depending on which of the output port 415 or the input port 416 is to be coupled to the pump 412 (see FIG. 17).

The water change controller 420 is operable in a reservoir draining mode and a reservoir filling mode. In the reservoir draining mode, fluid flows into the reservoir port 414 to the pump 412 via conduit 480. In the embodiment shown in FIG. 15, the fluid is pumped to the output port 415 via the diverter valve 431 and conduits 483 and 481. In the reservoir filling mode, fluid flows into the input port 416 to the pump 412 via the diverter valve 431 and conduits 482 and 483. More information regarding exemplary valve systems will be described in the detailed description of FIGS. 16 and 17.

Figure 16:
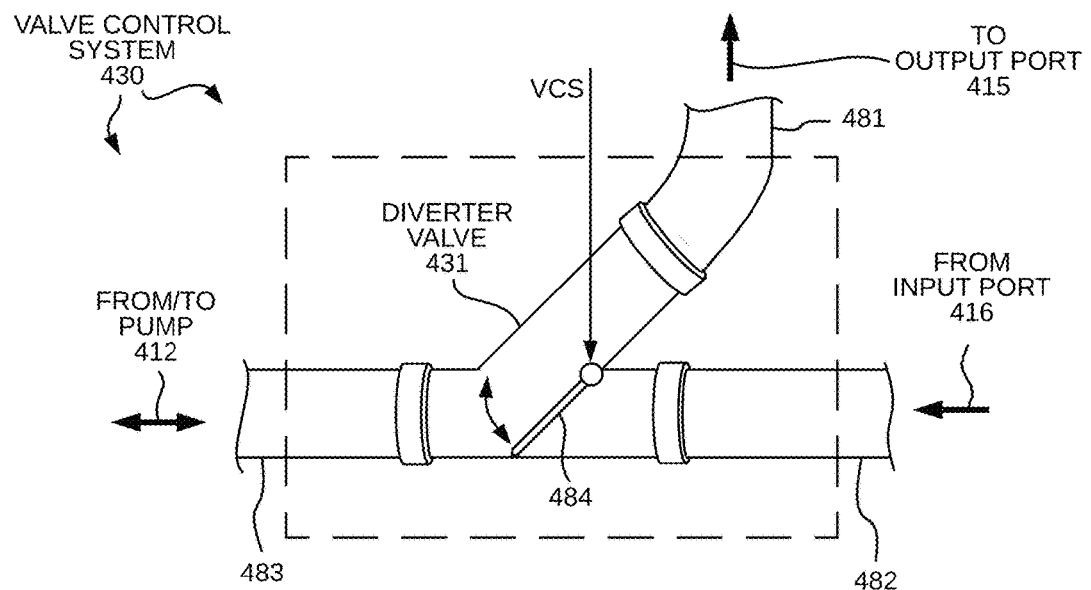
FIG. 16 shows a diagram of the valve control system 430.

FIG. 16 shows a diagram of the valve control system 430. The valve control system 430 includes the diverter valve 431 having a flapper 484. When the water change controller 420 is operable in the reservoir draining mode, the flapper 484 of diverter valve 431 is not engaged. In other words, in the reservoir draining mode, the pump 412 is coupled to the output port 415 via the diverter valve 431 and conduits 483 and 481.

When the water change controller 420 is operable in the reservoir filling mode, the flapper 484 of diverter valve 431 is engaged. In other words, the pump 412 is coupled to the input port 416 via the diverter valve 431 and conduits 483 and 482.

FIG. 17 shows a diagram of another embodiment of the valve control system 432. The valve control system 432 includes the input valve 433 and the output valve 434. When the water change controller 420 is operable in the reservoir draining mode, input valve 433 is closed and output valve 434 is open. In other words, the pump 412 is coupled to the output port 415 via the output valve 434 and conduits 483 and 481.

When the water change controller 420 is operable in the reservoir filling mode, input valve 433 is open and output valve 434 is closed. In other words, the pump 412 is coupled to the input port 416 via the input valve 433 and conduits 483 and 482.

Figure 18:
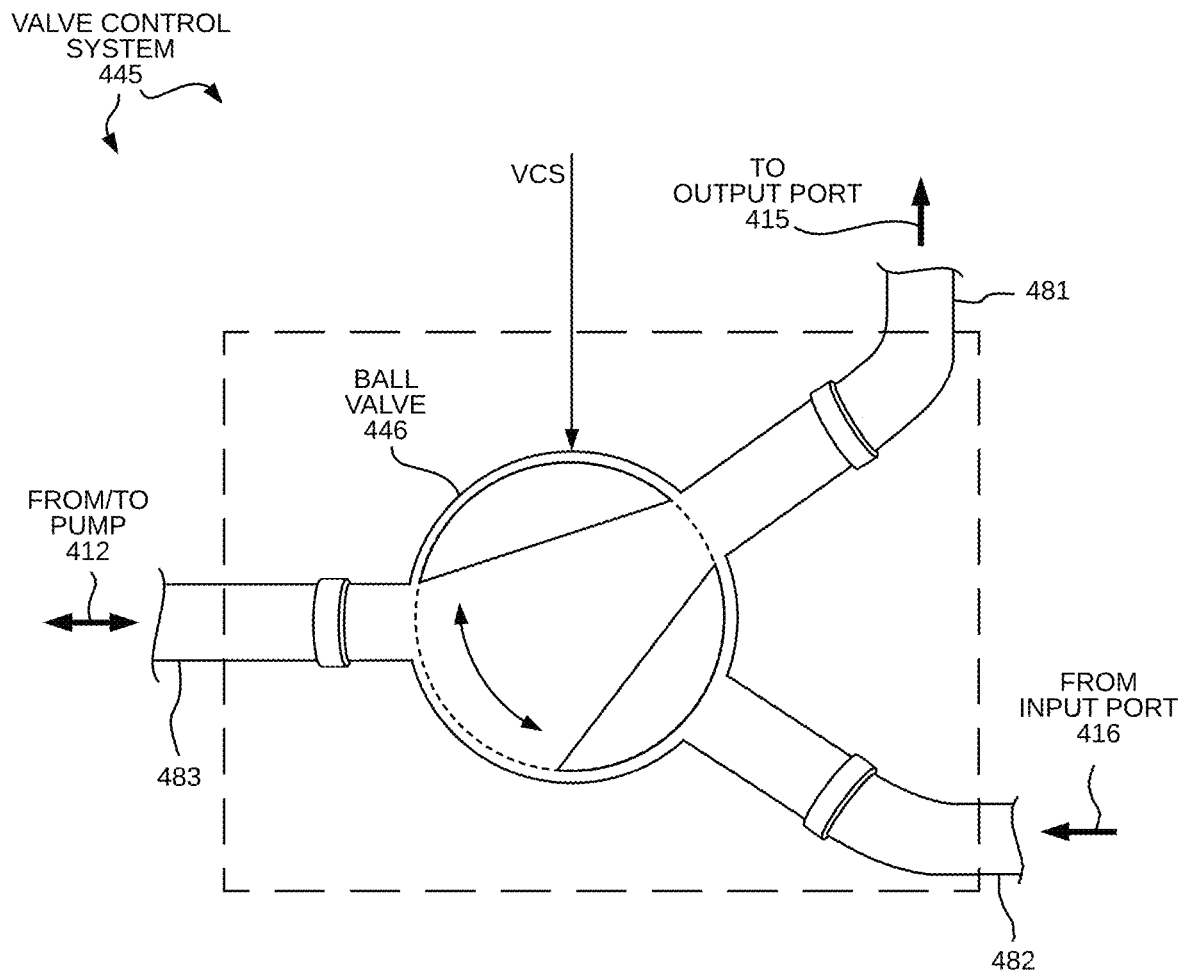
FIG. 18 shows a diagram of another embodiment of the valve control system 445.

FIG. 18 shows a diagram of another embodiment of the valve control system 445. The valve control system 445 includes a ball valve 448. The ball valve 448 rotates to direct or prevent flow from or to pump 412. For example, when the water change controller 420 is operable in the reservoir draining mode, the ball valve 448 couples the pump 412 to the output port 415. In the reservoir draining mode, the pump 412 is not coupled to the input port 416.

In the example when the water change controller 420 is operable in the reservoir filling mode, the ball valve 448 couples the pump 412 to the input port 416. In the reservoir draining mode, the pump 412 is not coupled to the output port 415.

Figure 19:
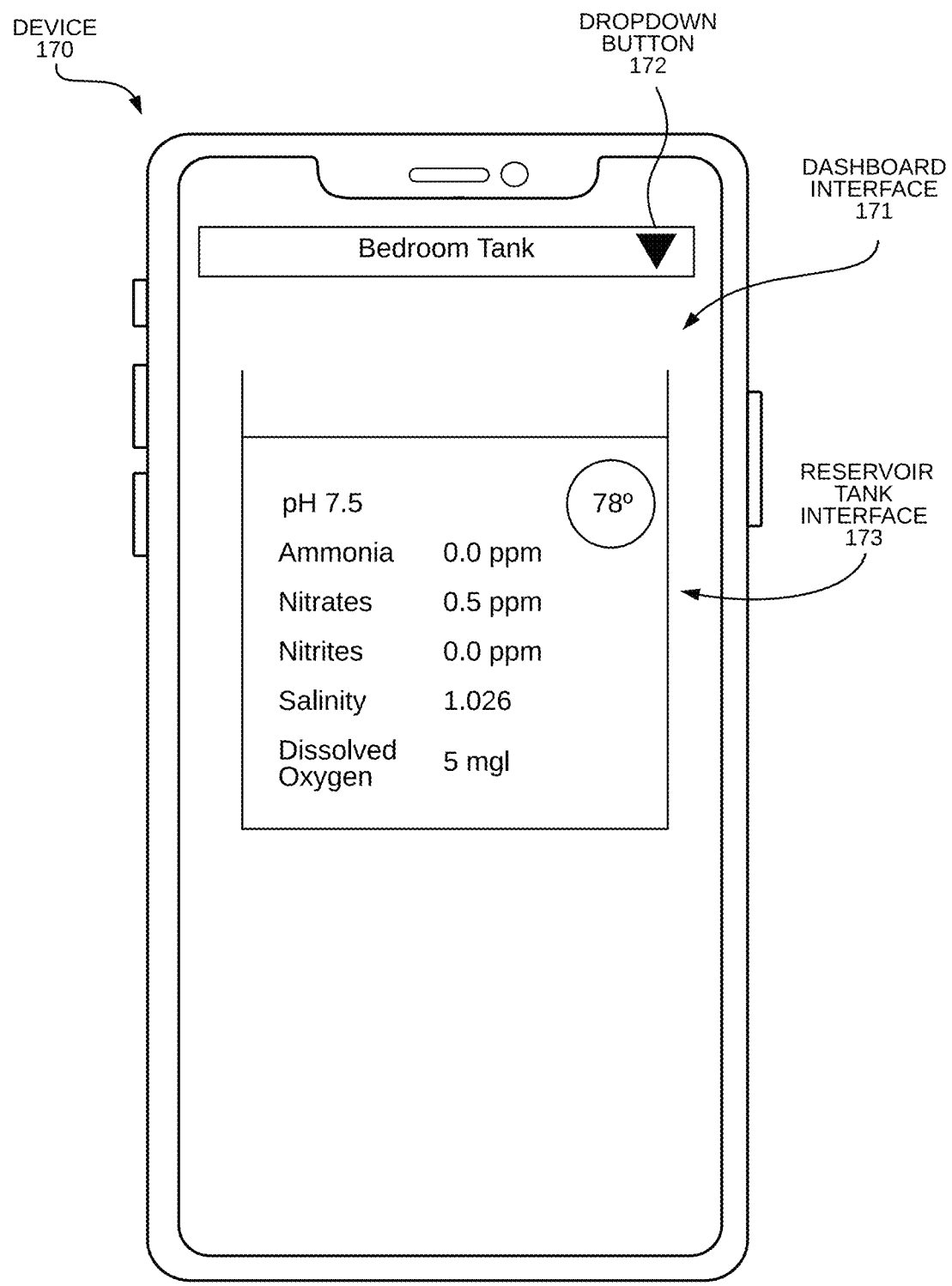
FIG. 19 is a diagram of an exemplary dashboard interface 171 presented on a device 170.

FIG. 19 is a diagram of an exemplary dashboard interface 171 presented on a device 170. The dashboard interface 171 includes a dropdown button 172 and a reservoir tank interface 173. In the example shown in FIG. 19, the reservoir tank interface 173 displays information obtained by the quality monitor 143, including but not limited to temperature, salinity, ammonia, dissolved oxygen, nitrates, nitrites, and pH. The reservoir tank interface 173 optionally shows water level information obtained by level sensor 142. The dropdown button 172 allows the user to select from various tank interfaces.

Figure 20:
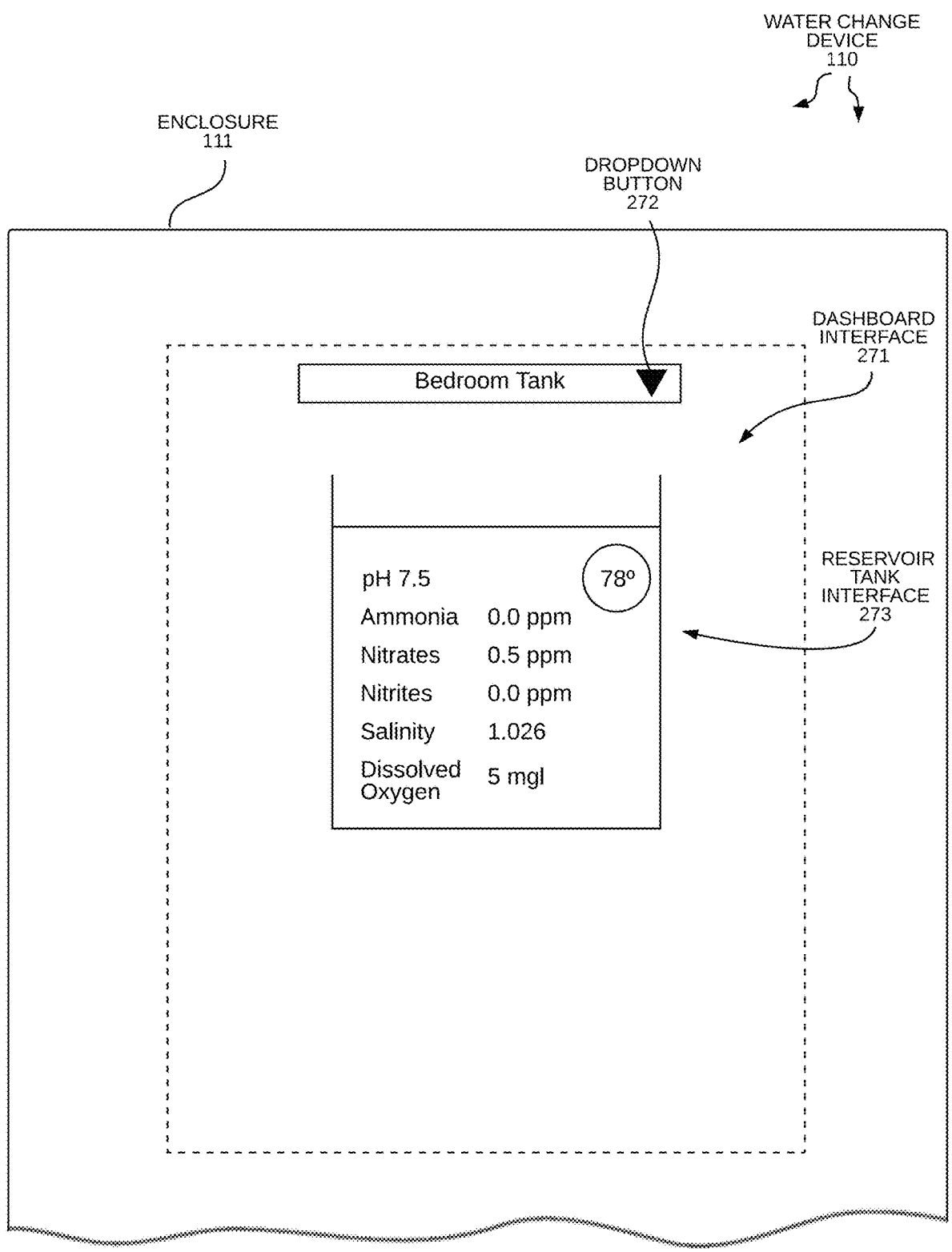
FIG. 20 is a diagram of an exemplary dashboard interface 271 presented on the enclosure 111 of water change device 110.

FIG. 20 is a diagram of an exemplary dashboard interface 271 presented on the enclosure 111 of water change device 110. The dashboard interface 271 includes a dropdown button 272 and a reservoir tank interface 273. In the example shown in FIG. 20, the reservoir tank interface 273 displays information obtained by the quality monitor 143 (e.g. temperature, salinity, ammonia, dissolved oxygen, nitrates, nitrites, and pH). The reservoir tank interface 273 optionally shows water level information obtained by level sensor 142. The dropdown button 272 allows the user to select from various tank interfaces.

Figure 21:
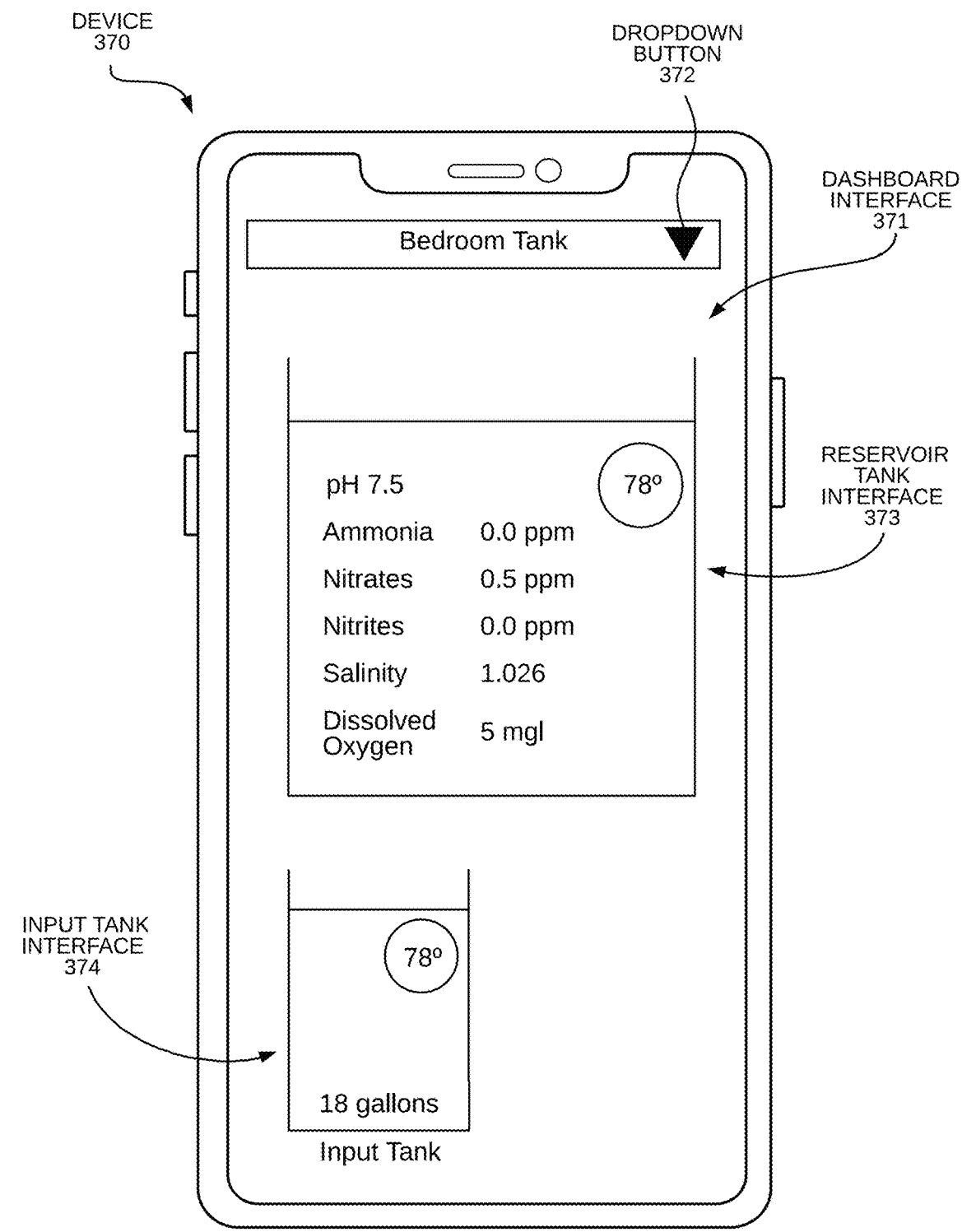
FIG. 21 is a diagram of an exemplary dashboard interface 371 presented on a device 370.

FIG. 21 is a diagram of an exemplary dashboard interface 371 presented on a device 370. The dashboard interface 371 includes a dropdown button 372, a reservoir tank interface 373, and an input tank interface 374. In the example shown in FIG. 21, the reservoir tank interface 373 displays information obtained by the quality monitor 243 (e.g. temperature, salinity, ammonia, dissolved oxygen, nitrates, nitrites, and pH). The reservoir tank interface 373 optionally shows water level information obtained by level sensor 242. The input tank interface 374 displays information obtained from level sensor 252 and quality monitor 253. The dropdown button 372 allows the user to select from various tank interfaces.

Figure 22:
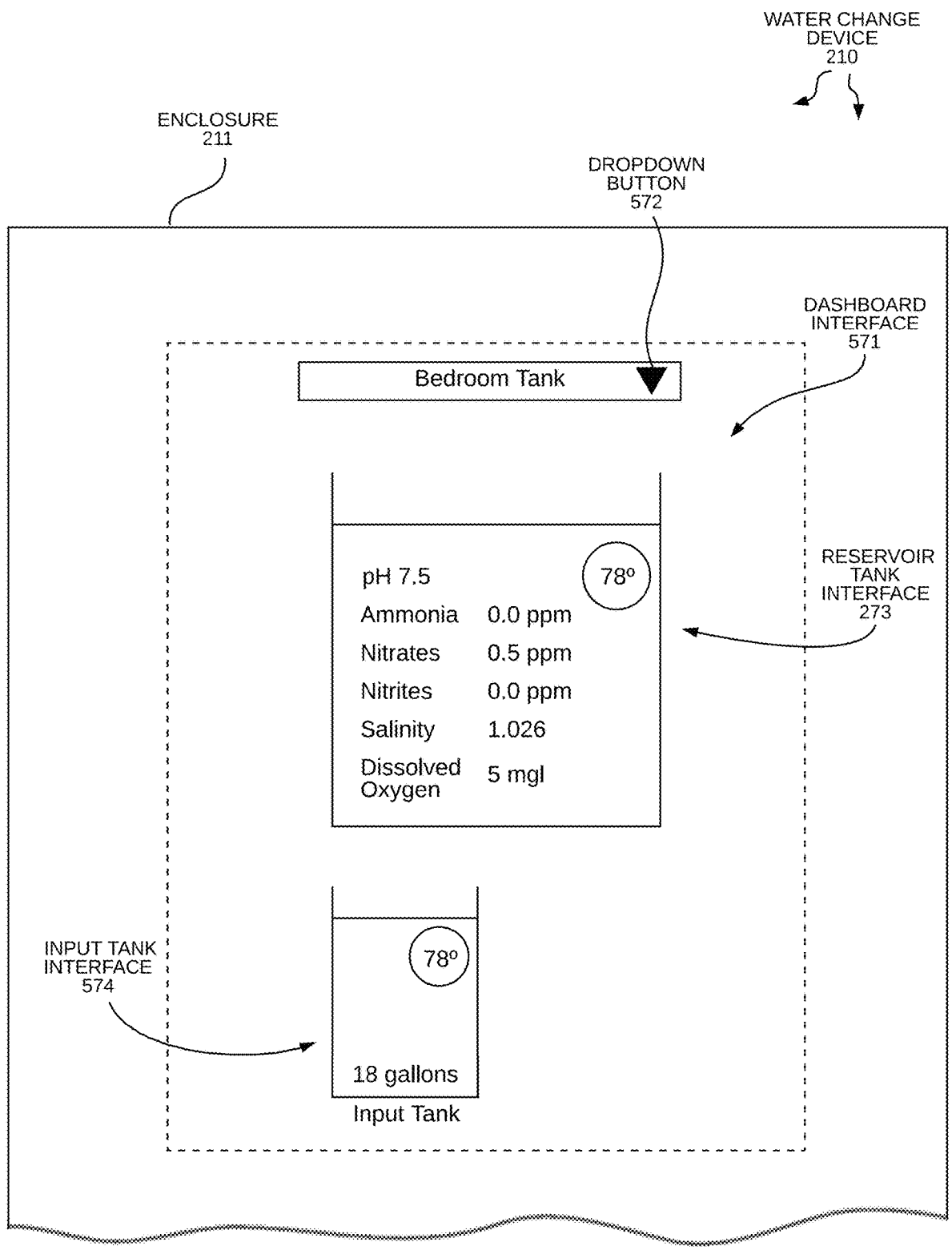
FIG. 22 is a diagram of an exemplary dashboard interface 571 presented on the enclosure 211 of water change device 210.

FIG. 22 is a diagram of an exemplary dashboard interface 571 presented on the enclosure 211 of water change device 210. The dashboard interface 571 includes a dropdown button 572, a reservoir tank interface 573, and an input tank interface 574. In the example shown in FIG. 22, the reservoir tank interface 573 displays information obtained by the quality monitor 243 (e.g. temperature, salinity, ammonia, dissolved oxygen, nitrates, nitrites, and pH). The reservoir tank interface 573 optionally shows water level information obtained by level sensor 242. The input tank interface 574 displays information obtained from level sensor 252 and quality monitor 253. The dropdown button 572 allows the user to select from various tank interfaces.

Figure 23:
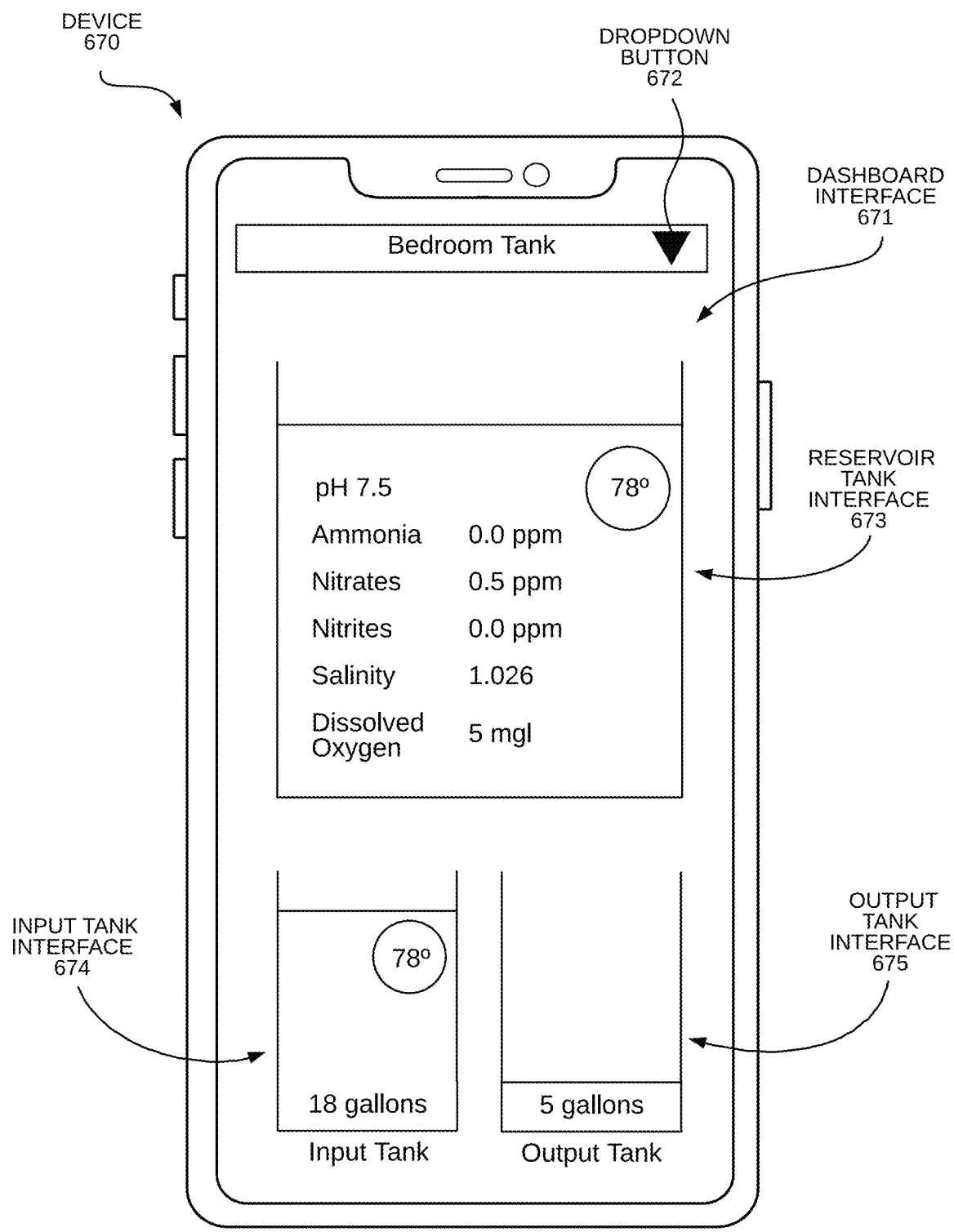
FIG. 23 is a diagram of an exemplary dashboard interface 671 presented on a device 670.

FIG. 23 is a diagram of an exemplary dashboard interface 671 presented on a device 670. The dashboard interface 671 includes a dropdown button 672, a reservoir tank interface 673, an input tank interface 674, and an output tank interface 675. In the example shown in FIG. 23, the reservoir tank interface 673 displays information obtained by the quality monitor 343 (e.g. temperature, salinity, ammonia, dissolved oxygen, nitrates, nitrites, and pH). The reservoir tank interface 673 optionally shows water level information obtained by level sensor 342. The input tank interface 674 displays information obtained from level sensor 352 and quality monitor 353. The output tank interface 675 displays information obtained from level sensor 362. The dropdown button 672 allows the user to select from various tank interfaces.

Figure 24:
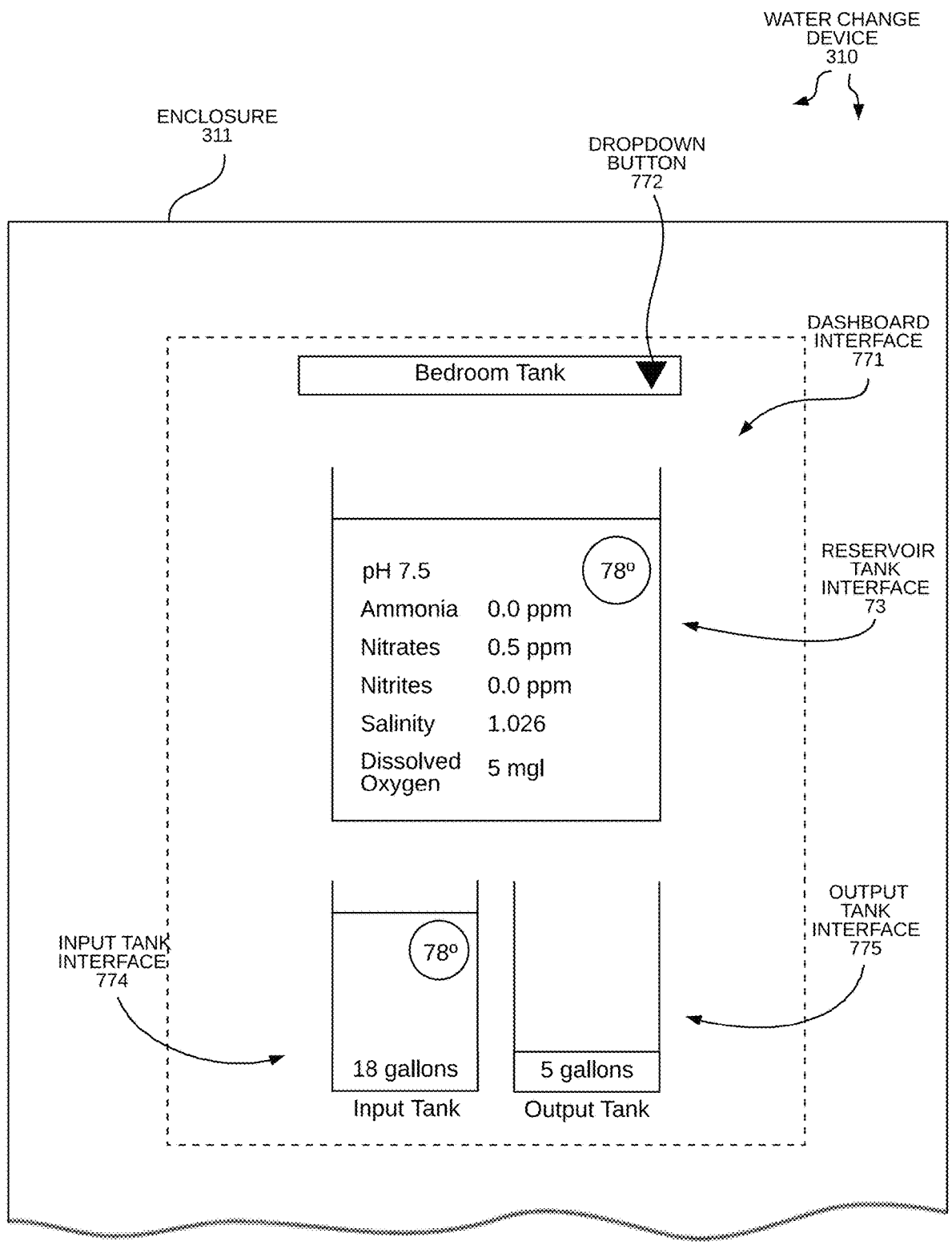
FIG. 24 is a diagram of an exemplary dashboard interface 771 presented on the enclosure 311 of water change device 310.

FIG. 24 is a diagram of an exemplary dashboard interface 771 presented on the enclosure 311 of water change device 310. The dashboard interface 771 includes a dropdown button 772, a reservoir tank interface 773, an input tank interface 774, and an output tank interface 775. In the example shown in FIG. 24, the reservoir tank interface 773 displays information obtained by the quality monitor 343 (e.g. temperature, salinity, ammonia, dissolved oxygen, nitrates, nitrites, and pH). The reservoir tank interface 773 optionally shows water level information obtained by level sensor 342. The input tank interface 774 displays information obtained from level sensor 352 and quality monitor 353. The output tank interface 775 displays information obtained from level sensor 362. The dropdown button 772 allows the user to select from various tank interfaces.

Figure 25:
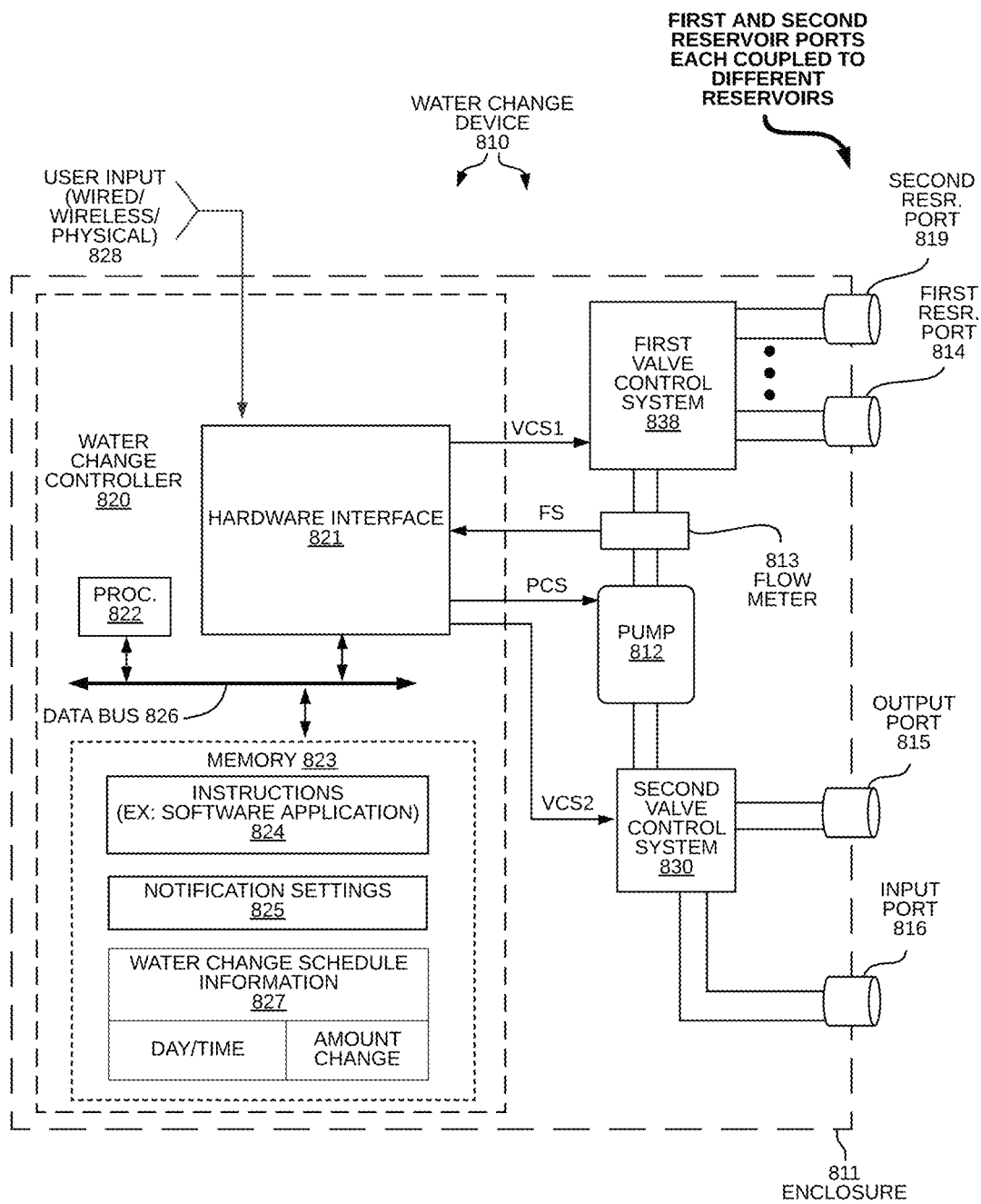
FIG. 25 is a block diagram of another embodiment of a water change device 805 performing water changes for multiple reservoirs.

FIG. 25 is a block diagram of another embodiment of a water change device 810 performing water changes for multiple reservoirs. In the example shown in FIG. 25, the water change device 810 facilitates water changes of liquid stored in multiple reservoirs, namely, a first reservoir and a second reservoir. In another embodiment, a water change device performs water changes of liquid stored in more than two reservoirs with minimal user involvement. The water change device 810 comprises a water change controller 820, a pump 812, a flow meter 813, a first reservoir port 814, a second reservoir port 819, a first valve control system 838, an output port 815, an input port 816, a second valve control system 830, and an enclosure 811. The water change controller 820 includes a processor 822, a memory 823, a hardware interface 821, and a data bus 826. The memory 823 stores an amount of computer readable instructions 824, notification settings information 825, and water change schedule information 827. The water change schedule information 827 is provided via user input 828. The water change device 810 performs water changing of multiple reservoirs in accordance with the water change schedule 827 stored in memory 823.

Reservoir controllers are disposed within each of the reservoirs. Each reservoir controller communicates with the water change controller 820 of the water change device 810. In one example, each reservoir controller includes an image sensor, a level sensor, and a quality monitor. In this example, the image sensor of each reservoir controller outputs and supplies an image signal to the water change controller 820 via the hardware interface 821. The image signal is a digital signal that stores image or video information from inside the reservoirs. In an example with a first reservoir and a second reservoir, the first reservoir sends the image signal IS1 and the second reservoir sends the image signal IS2 to the water change controller 820.

Each level sensor outputs and supplies water level signal RLS to the water change controller 820 via the hardware interface 821. The water level signal RLS is a digital signal indicative of fluid level within each reservoir. In an example with the first reservoir and the second reservoir, the first reservoir sends the water level signal RLS1 and the second reservoir sends the water level signal RLS2 to the water change controller 820.

Each quality monitor outputs and supplies water quality signal RQM to the water change controller 820 via the hardware interface 821. The water quality signal RQM is a digital signal indicative of quality of fluid within each reservoir. In an example with the first reservoir and the second reservoir, the first reservoir sends the water quality signal RQM1 and the second reservoir sends the water quality signal RQM2 to the water change controller 820. For illustrative purposes FIG. 25 does not show image sensor, water level, or quality monitor signals.

In operation, the water change device 810 performs water changes on multiple reservoirs. A water change involves draining liquid from and adding liquid to each reservoir. In the example shown in FIG. 25, the first reservoir is coupled to the pump 812 via the first reservoir port 814 and the first valve control system 838. In this example, the second reservoir is coupled to the pump 812 via the second reservoir port 819 and the valve control system 838.

The first valve control system 838 includes any suitable hardware for selecting fluid flow between the pump 812 and reservoir ports. The water change controller 820 generates and supplies a digital control signal VCS1 to the first valve control system 838. The digital control signal VCS1 controls operation of the first valve control system 838. In one embodiment, the first valve control system 838 includes a diverter valve that toggles fluid flow between the pump 812 and either the first reservoir port 814 or the second reservoir port 819. In another embodiment, the first valve control system 838 includes a ball valve that toggles fluid flow between the pump 812 and either the first reservoir port 814 or the second reservoir port 819. In yet another embodiment, the first valve control system 838 includes two digitally controlled valves that are switched on and off depending on which of the first reservoir port 814 or the second reservoir port 819 is to be coupled to the pump 812.

The water change controller 820 generates and supplies a digital control signal VCS1 to the valve control system 838. The digital control signal VCS1 controls operation of the valve control system 838. During a water change operation, the water change controller 820 generates and supplies a digital control signal VCS1 to the first valve control system 838.

In one example, liquid flows from the first reservoir into the first reservoir port 814, through the first valve control system 838, through the flow meter 813, through pump 812, through the second valve control system 830, and out the output port 815. Next, liquid to be added to the first reservoir is received onto the input port 816, flows through second valve control system 830, through pump 812, through flow meter 813 and into the first reservoir via the first reservoir port 814. The flow meter 813 is any suitable hardware for detecting fluid flow through a conduit. In this example, the flow meter 813 generates and outputs a digital signal FS that is supplied to the water change controller 820 via the hardware interface 821. The control signal FS indicates a rate or amount of fluid that flows into or out of each reservoir via reservoir ports 814 and 819.

The pump 812 is any hardware suitable to pump fluid between two bodies of fluid. The water change controller 820 generates and supplies a digital control signal PCS to the pump 812. The digital control signal PCS controls operation of the pump 812. In a reservoir draining mode, the digital control signal PCS controls pump 812 to pump fluid from each reservoir through the first valve control system 838. In a reservoir filling mode, the digital control signal PCS controls pump 812 to pump fluid from the input port 816, through the second valve control system 830, through the first valve control system 838, and into the first reservoir through the first reservoir port 814 or into the second reservoir through the second reservoir port 819.

The second valve control system 830 includes any suitable hardware for selecting fluid flow between the pump 812 and either the output port 815 or the input port 816. The water change controller 820 generates and supplies a digital control signal VCS2 to the second valve control system 830. The digital control signal VCS2 controls operation of the second valve control system 830. In one embodiment, the second valve control system 830 includes a diverter valve that toggles fluid flow between the pump 812 and either the output port 815 or the input port 816. In another embodiment, the second valve control system 830 includes a ball valve that toggles fluid flow between the pump 812 and either the output port 815 or the input port 816. In yet another embodiment, the second valve control system 830 includes two digitally controlled valves that are switched on and off depending on which of the output port 815 or the input port 816 is to be coupled to the pump 812.

The water change schedule information 827 is configured based on user input 828. The water change schedule information 827 indicates when water change operations are to be performed on each of the multiple reservoirs and the amount of liquid to be swapped out of each reservoir. In this example, the water change schedule information 827 stores one or more day and times each with a corresponding amount of water to change in the first reservoir and the second reservoir. The user input 828 is supplied to the hardware interface 821 of the water change controller 820 via a wired or wireless connection or is input via a physical contact. In a wired connection embodiment, user input 828 directly connects to the water change controller 820 through a wired connection. The wired connection is any suitable wired data connection that supports data transfer, such as USB or ethernet. In a wireless connection embodiment, user input 828 is input into a remote control that wirelessly communicates with the water change controller 820. In a physical contact embodiment, the water change device 810 includes buttons or a touch display that receives user input 828 that configures the water change controller 820.

The notification settings information 825 indicates how and when a user is to be notified. Notification settings information 825 includes information indicating trigger events such as fluid levels reaching certain thresholds or fluid quality reaching certain thresholds. Notification settings information 825 includes information indicating how a user is to be notified of a triggering event, such as by water change device 810 outputting a signal, such as light or sound, or via push notification, Short Message Service (SMS), Multimedia Messaging Service (MMS), email, or phone call.

The processor 822 is any suitable processor capable of interpreting or executing instructions. The hardware interface 821 is any suitable hardware capable of interfacing with input or output devices, including cameras, microphones, microcontrollers, processors, touch displays, wireless devices, sensors, actuators, heating elements, motors, pumps, network devices, and other auxiliary devices involved in perform water change operations. The memory 823 is a computer-readable medium that includes any kind of computer memory such as floppy disks, conventional hard disks, CD-ROMS, Flash ROMS, non-volatile ROM, RAM, and non-volatile memory. In operation, the processor 822 reads instructions 824 from memory 823 over data bus 826. In another embodiment, the memory 823 is external to the water change controller 820, such as cloud-based storage, and the processor 822 accesses the memory 823 over a network. In this embodiment, the instructions 824 are a software application. When executed or interpreted by the processor 822, the software application configures notification settings information 825 and water change schedule information 827 based on user input 828 and performs water changes of liquid stored in each of the reservoirs in accordance with the water change schedule information 827.

Figure 26:
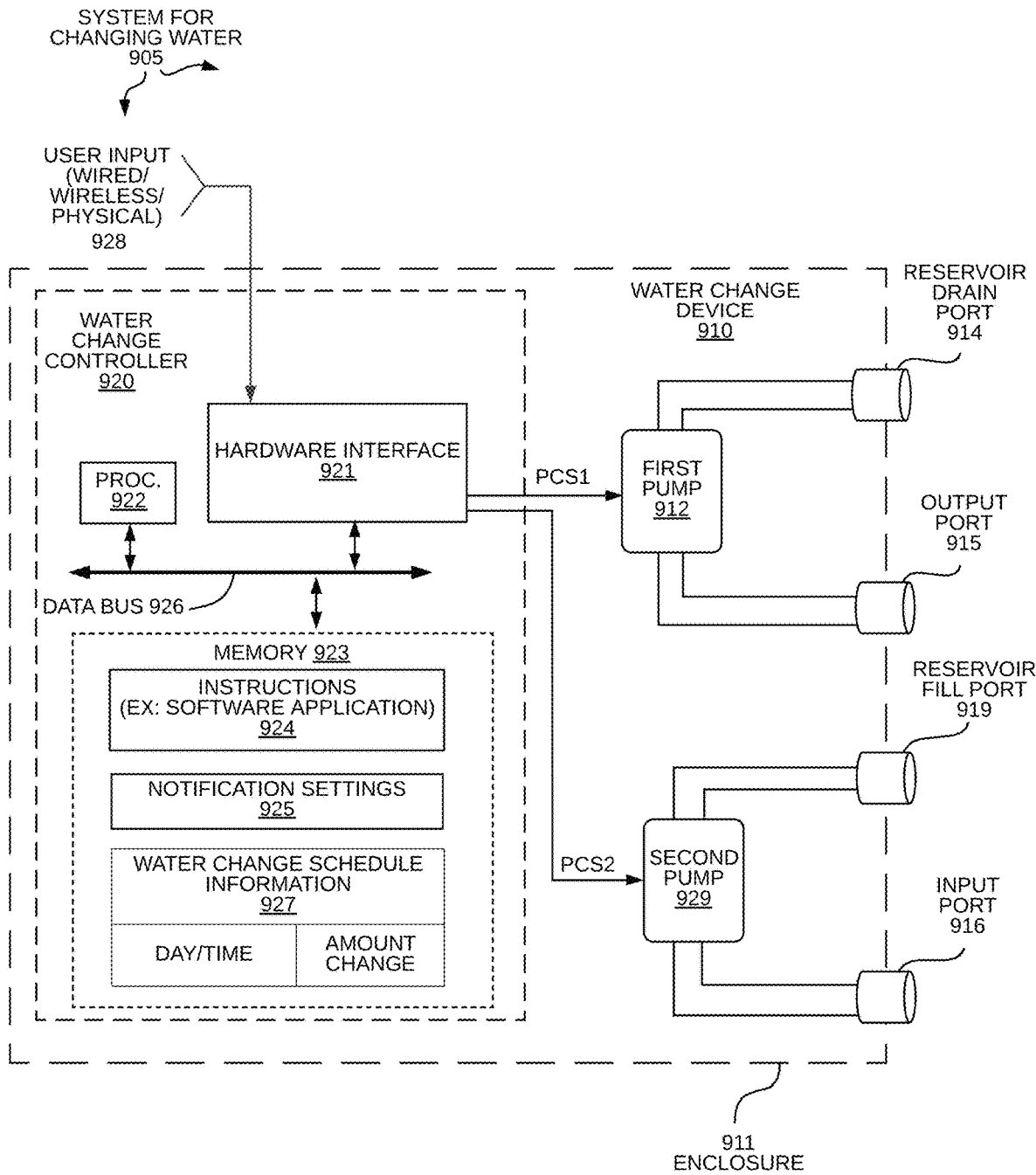
FIG. 26 is a block diagram of another embodiment of a water change device 910 having more than one pump.

FIG. 26 is a block diagram of another embodiment of a water change device 910 having more than one pump. In this embodiment, each input and output port has its own dedicated pump. Flow meters are optional and not shown in FIG. 26. For example, FIG. 26 shows the water change device 910 including a water change controller 920, a first pump 912, and a second pump 929. In this example, a reservoir drain port 914 and an output port 915 are each coupled to the first pump 912. Furthermore, a reservoir fill port 919 and an input port 916 are each coupled to the second pump 929.

Each of the pumps 912 and 929 is any suitable hardware that is operable to pump fluid between two bodies of fluid. The water change controller 920 generates and supplies a digital control signal PCS1 to the first pump 912. The digital control signal PCS1 controls operation of the pump 912. The water change controller 920 generates and supplies a digital control signal PCS2 to the second pump 929. The digital control signal PCS2 controls operation of the second pump 929.

In a reservoir draining mode, the digital control signal PCS1 controls the first pump 912 to pump fluid from the reservoir drain port 914 and through the output port 915. In a reservoir filling mode, the digital control signal PCS2 controls the second pump 929 to pump fluid from the input port 916, through the reservoir fill port 919.

Figure 27:
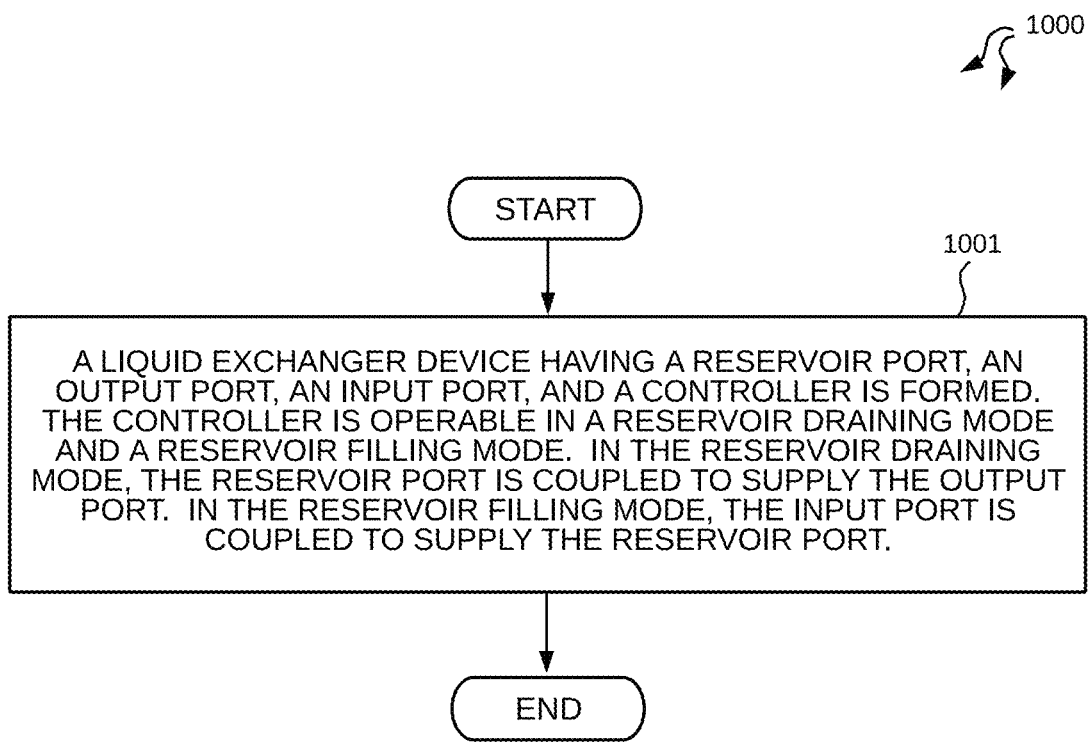
FIG. 27 is a flowchart of a method 1000 in accordance with one novel aspect.

FIG. 27 is a flowchart of a method 1000 in accordance with one novel aspect. In a first step (step 1001), a liquid exchanger device having a reservoir port, an output port, an input port, and a controller is formed. The controller is operable in a reservoir draining mode and a reservoir filling mode. In the reservoir draining mode, the reservoir port is coupled to supply the output port. In the reservoir filling mode, the input port is coupled to supply the reservoir port.

Figure 28:
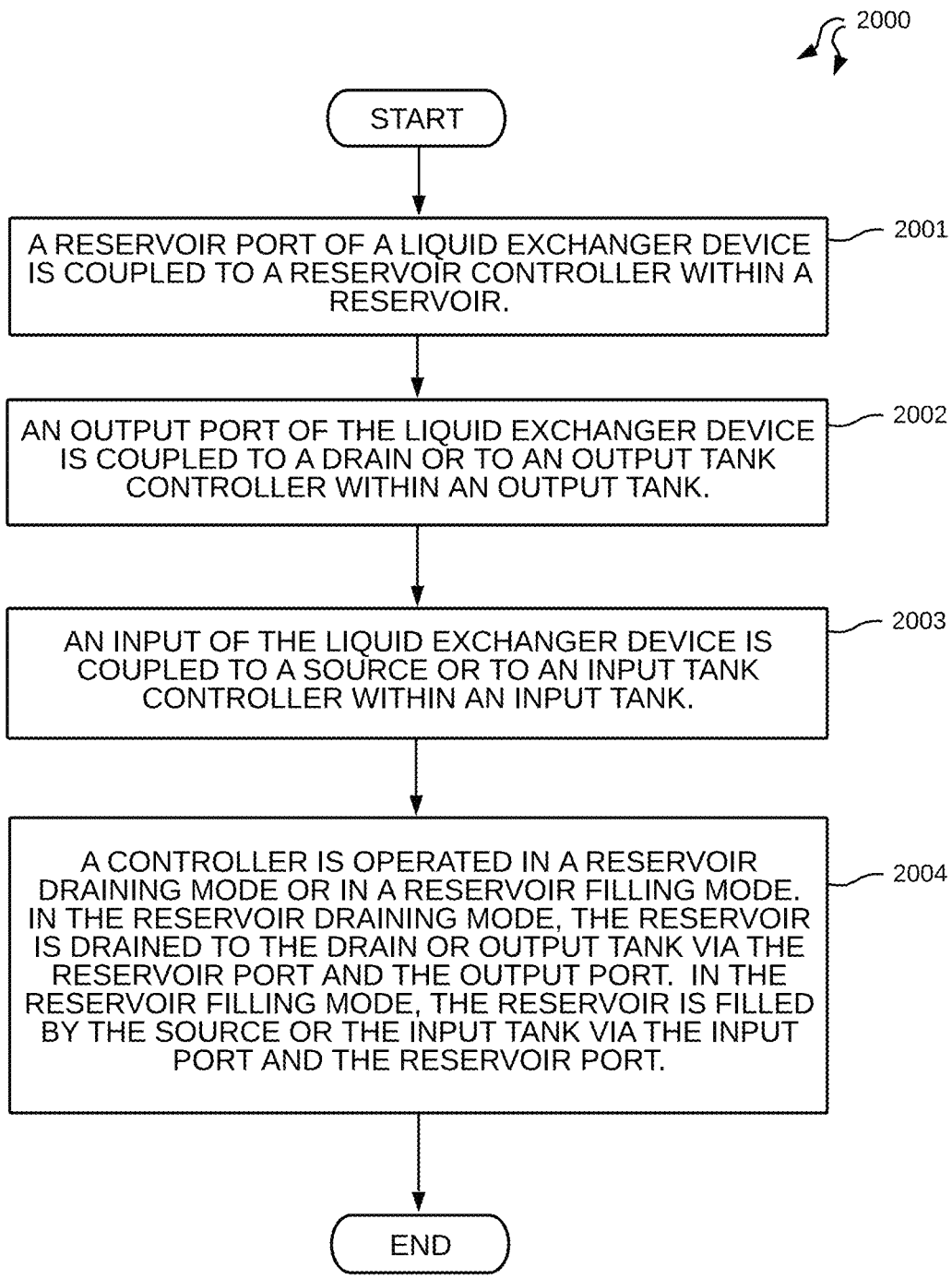
FIG. 28 is a flowchart of a method 2000 in accordance with one novel aspect.

FIG. 28 is a flowchart of a method 2000 in accordance with one novel aspect. In a first step (step 2001), a reservoir port of a liquid exchanger device is coupled to a reservoir controller within a reservoir. In a second step (step 2002), an output port of the liquid exchanger device is coupled to a drain or to an output tank controller within an output tank. In a third step (step 2003), an input of the liquid exchanger device is coupled to a source or to an input tank controller within an input tank. In a fourth step (step 2004), a controller is operated in a reservoir draining mode or in a reservoir filling mode. In the reservoir draining mode, the reservoir is drained to the drain or output tank via the reservoir port and the output port. In the reservoir filling mode, the reservoir is filled by the source or the input tank via the input port and the reservoir port.

Figure 29:
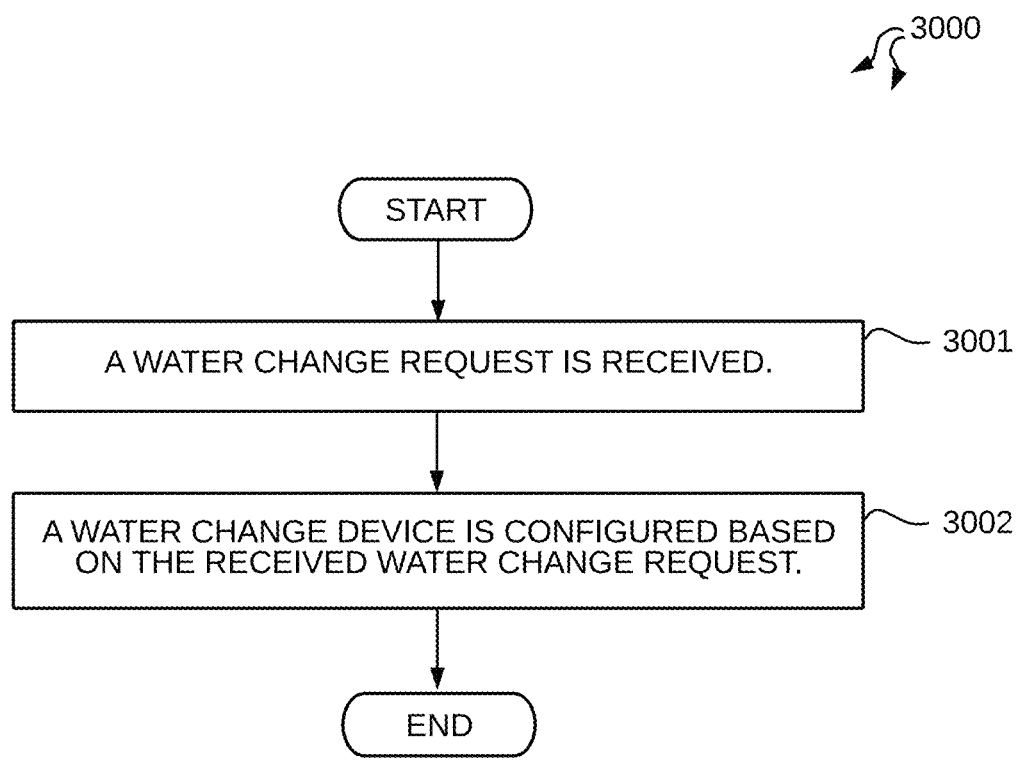
FIG. 29 is a flowchart of a method 3000 in accordance with one novel aspect.

FIG. 29 is a flowchart of a method 3000 in accordance with one novel aspect. In a first step (step 3001), a water change request is received. In a second step (step 3002), a water change device is configured based on the received water change request.

Figure 30:
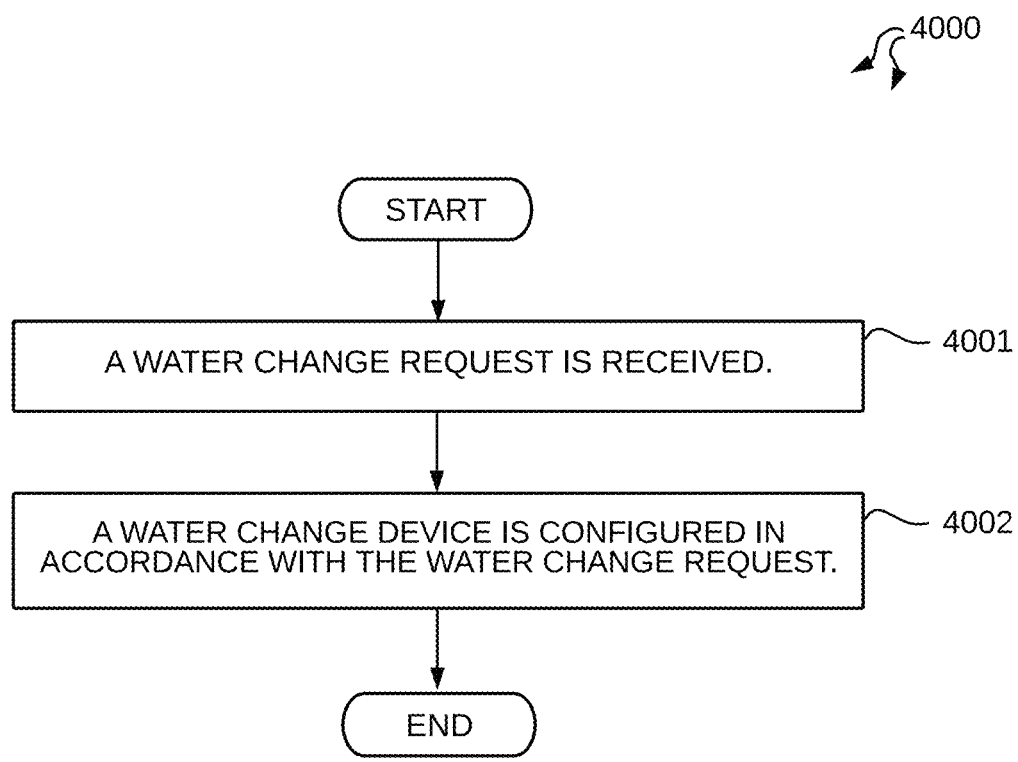
FIG. 30 is a flowchart of a method 4000 in accordance with one novel aspect.

FIG. 30 is a flowchart of a method 4000 in accordance with one novel aspect. In a first step (step 4001), a water change request is received. In a second step (step 4002), a water change device is configured in accordance with the water change request.

Although certain specific embodiments are described above for instructional purposes, the teachings of this patent document have general applicability and are not limited to the specific embodiments described above. For example, ports 414-416 of the water change device 410 could instead be realized as electrically controlled valves that are selectively opened and closed. Furthermore, other types of valves for directing the flow of water may be used. For example, a ball valve could be used instead of diverter valve 431. Additionally, each valve control system can be implemented outside of the enclosure of a water change device. For example, valve control systems 430 and 432 are disposed outside of enclosure 411. Each valve control system 430 and 432 are coupled to the pump 412 via port 415. In this example where the valve control systems 430 and 432 are disposed outside of enclosure 411, the water change device 410 only requires at least two ports 414-415. In another example, valve control system 838 is separately removed from the enclosure 811. In various other embodiments, no flow meter is included in the water change device. Pump operating duration is used to determine the amount of fluid supplied to or drained from the reservoir. Alternatively, the water change device uses information received from liquid level sensors to determine the amount of fluid supplied to or drained from the reservoir. Accordingly, various modifications, adaptations, and combinations of various features of the described embodiments can be practiced without departing from the scope of the invention as set forth in the claims.

What is claimed is:

1. An apparatus comprising:
   an enclosure having a reservoir port configured to couple the apparatus to a reservoir that stores a first liquid, an output port, and an input port configured to couple the apparatus to receive a second liquid; and
   means for performing a reservoir draining mode and a reservoir filling mode based on an input received onto the means, wherein in the reservoir draining mode, the means controls at least one valve to couple the reservoir port to the output port such that an amount of the first liquid is removed from the reservoir through the output port while the input port is bypassed, and wherein in the reservoir filling mode, the means controls at least one valve to couple the input port to the reservoir port such that an amount of the second liquid is supplied from the input port to the reservoir while the output port is bypassed; and
   wherein the means is communicatively coupled to a reservoir controller, and wherein the reservoir controller includes:
   a liquid level sensor; and
   a liquid quality monitor, wherein the liquid quality monitor detects at least one item selected from the group consisting of: temperature, salinity, ammonia, dissolved oxygen, nitrates, and pH.

2. The apparatus of claim 1, wherein the means comprises a controller, and wherein the apparatus is a liquid exchanger device.

3. The apparatus of claim 1, wherein the input received onto the means is selected from the group consisting of: user input supplied via an input panel or via a remote device, stored water change schedule information supplied via user input, or an input generated by a reservoir controller.

4. An apparatus comprising:
   a reservoir port configured to couple the apparatus to a reservoir that stores a first liquid;
   an output port;
   an input port configured to couple the apparatus to receive a second liquid; and
   a controller that operates in a reservoir draining mode and a reservoir filling mode in accordance with an input received onto the controller, wherein in the reservoir draining mode, the controller controls at least one valve to couple the reservoir port to the output port such that an amount of the first liquid is removed from the reservoir through the output port while the input port is bypassed, and wherein in the reservoir filling mode, the controller controls at least one valve to couple the input port to the reservoir port such that an amount of the second liquid is supplied from the input port to the reservoir while the output port is bypassed; and
   wherein the controller is communicatively coupled to a reservoir controller, and wherein the reservoir controller includes:
   a liquid level sensor; and
   a liquid quality monitor, wherein the liquid quality monitor detects at least one item selected from the group consisting of: temperature, salinity, ammonia, dissolved oxygen, nitrates, and pH.

5. The apparatus of claim 4, wherein the output port is coupled to an output tank or to a drain, and wherein in the reservoir draining mode, the first liquid in the reservoir flows into the reservoir port, out of the output port, and to the output tank or the drain.

6. The apparatus of claim 4, wherein the input port is coupled to a source or an input tank, and wherein in the reservoir filling mode, the second liquid from the source or the input tank flows into the input port, out of the reservoir port, and to the reservoir.

7. The apparatus of claim 4, further comprising:
   a pump.

8. The apparatus of claim 7, wherein the apparatus comprises at least two valves when the apparatus is configured to change liquid in more than one reservoir.

9. The apparatus of claim 4, wherein the reservoir draining mode and the reservoir filling mode are enabled in accordance with a schedule or in response to user input.

10. The apparatus of claim 4, further comprising:
    an enclosure;
    a control panel;

a pump; and a flow meter, wherein the flow meter detects flow into and out of the reservoir port.

11. The apparatus of claim 4, wherein the reservoir controller is coupled to receive images obtained from a camera.

12. The apparatus of claim 4, wherein the input port is coupled to an input tank, wherein the controller is communicatively coupled to an input tank controller, and wherein the input tank controller comprises:

a heater;

a filter;

a liquid level sensor; and a liquid quality monitor, wherein the liquid quality monitor detects at least one item selected from the group consisting of: temperature, salinity, ammonia, dissolved oxygen, nitrates, and pH.

13. The apparatus of claim 4, wherein the output port is coupled to an output tank, wherein the controller is communicatively coupled to an output tank controller, and wherein the output tank controller comprises:

a liquid level sensor.

14. The apparatus of claim 4, wherein the controller is remotely controllable via a wireless communication link, wherein the controller provides status information remotely, and wherein the controller communicates a notification in response to detecting a preconfigured setting.

15. The apparatus of claim 14, wherein the status information includes liquid information of a reservoir, liquid information of an output tank, liquid information of an input tank, or liquid change status.

16. The apparatus of claim 4, wherein the apparatus is configurable via a virtual assistant.

17. The apparatus of claim 4, wherein the input received onto the controller is selected from the group consisting of: user input supplied via an input panel or via a remote device, stored water change schedule information supplied via user input, or an input generated by a reservoir controller.

18. A method comprising:

forming a liquid exchanger device having a reservoir port configured to couple the liquid exchanger device to a reservoir that stores a first liquid, an output port, an input port configured to couple the liquid exchanger device to receive a second liquid, and a controller; and wherein the controller is communicatively coupled to a reservoir controller, and wherein the reservoir controller includes:

a liquid level sensor; and a liquid quality monitor, wherein the liquid quality monitor detects at least one item selected from the group consisting of: temperature, salinity, ammonia, dissolved oxygen, nitrates, and pH; and operating the controller in a reservoir draining mode, wherein in the reservoir draining mode, the controller controls at least one valve to couple the reservoir port to the output port to such that an amount of first liquid is removed from a reservoir while the input port is bypassed; and operating the controller in a reservoir filling mode, wherein in the reservoir filling mode, the controller controls at least one valve to couple the input port to the reservoir port such that an amount of the second liquid is supplied to the reservoir while the output port is bypassed, and wherein the controller operates in the reservoir draining mode and the reservoir filling mode in accordance with input received onto the controller.

19. The method of claim 18, further comprising:

coupling the output port to an output tank or to a drain in the reservoir draining mode, wherein the first liquid in the reservoir flows into the reservoir port, out of the output port, and to the output tank or the drain;

coupling the input port to a source or input tank in the reservoir filling mode, wherein the second liquid from the source or the input tank flows into the input port, out of the reservoir port, and to the reservoir; and enabling the reservoir draining mode and the reservoir filling mode in accordance with a schedule or in response to user input.

20. The method of claim 18, further comprising:

coupling at least one valve between the output port and a pump of the liquid exchanger device, wherein the at least one valve is controllable to control liquid flow from the pump to the output port; and coupling the at least one valve between input port and the pump of the liquid exchanger device, wherein the at least one valve is controllable to control liquid flow from the input port to the pump.

21. The method of claim 18, wherein the controller is remotely controllable, wherein the controller provides status information remotely, wherein the controller communicates a notification in response to detecting a preconfigured setting, and wherein the status information includes liquid information of a reservoir, liquid information of an output tank, liquid information of an input tank, or liquid change status.

22. The method of claim 18, wherein the input received onto the controller is selected from the group consisting of: user input supplied via an input panel or via a remote device, stored water change schedule information supplied via user input, or an input generated by a reservoir controller.

\* \* \* \* \*